(12) United States Patent
Hanzawa

(10) Patent No.: US 6,592,041 B1
(45) Date of Patent: Jul. 15, 2003

(54) TRANSFER APPARATUS AND RECORDING AND/OR REPRODUCTION METHOD AND TRANSFER METHOD AND RECORDING AND/OR REPRODUCTION METHOD

(75) Inventor: Hisashi Hanzawa, Tokyo (JP)

(73) Assignee: Sony Corporation, Tokyo (JP)

( * ) Notice: Subject to any disclaimer, the term of this patent is extended or adjusted under 35 U.S.C. 154(b) by 309 days.

(21) Appl. No.: 09/644,120

(22) Filed: Aug. 23, 2000

(30) Foreign Application Priority Data

Aug. 23, 1999 (JP) .......................................... 11-236203
Dec. 9, 1999 (JP) .......................................... 11-350863

(51) Int. Cl.⁷ ................................................ G06K 7/00
(52) U.S. Cl. ...................................... 235/486; 235/435
(58) Field of Search ................................ 235/435, 486, 235/439, 436, 441; 361/684

(56) References Cited

U.S. PATENT DOCUMENTS

| | | | |
|---|---|---|---|
| 4,727,444 A | 2/1988 | Fukushima et al. | ........... 360/97 |
| 4,763,300 A | 8/1988 | Yukawa | ........ 365/52 |
| 5,473,505 A | * 12/1995 | Kessoku et al. | ........... 361/684 |
| 5,573,413 A | * 11/1996 | David et al. | ........... 439/157 |
| 5,674,080 A | * 10/1997 | Takemura | ........ 439/159 |
| 5,730,610 A | * 3/1998 | Hsia et al. | ........... 439/155 |
| 5,781,232 A | 7/1998 | Ejima | ........... 348/233 |
| 6,138,916 A | * 10/2000 | Zolkos et al. | ........ 235/475 |

FOREIGN PATENT DOCUMENTS

| | | | |
|---|---|---|---|
| EP | 0663649 | 7/1995 | .......... G06K/13/08 |
| JP | 60209990 | 10/1985 | ............ G11C/5/00 |

* cited by examiner

*Primary Examiner*—Thien M. Le
*Assistant Examiner*—April Nowlin
(74) *Attorney, Agent, or Firm*—Jay H. Maioli

(57) ABSTRACT

A transfer apparatus for transferring a storage medium includes a holder for holding a storage medium, the holder being adapted to move between a first position for loading and unloading the storage medium and a second position for containing the storage medium on the chassis of the apparatus, a connector arranged in the holder and adapted to be connected to the terminal section of the storage medium when the holder is at the first position and a restriction member for restricting the movement of the holder from the first position to the second position until the connector is connected to the terminal section. With this arrangement, the terminal section of the storage medium and the connector can be reliably connected with each other.

55 Claims, 15 Drawing Sheets

TRANSFER APPARATUS AND RECORDING AND/OR REPRODUCTION METHOD AND TRANSFER METHOD AND RECORDING AND/OR REPRODUCTION METHOD

BACKGROUND OF THE INVENTION

1. Field of the Invention

This invention relates to a loading apparatus adapted to load and unload a storage medium such as a card-type memory device with ease and provided with a feature of preventing loading of a wrong storage medium from taking place.

2. Description of the Related Art

Known loading apparatus for loading and unloading a card-type memory device containing a semiconductor memory (to be referred to as IC card hereinafter) typically comprise a holder operating as card holding section for holding an IC card and an eject mechanism for discharging the IC card held in the card holding section. The holder is provided with a connector to be connected to the corresponding terminal arranged at the leading edge of the IC card. Thus, as the IC card is inserted into the holder through the loading slot arranged at the front end of the holder with its leading edge provided with the connection terminal facing forward, it becomes to be substantially entirely contained in the holder with the connection terminal engaged with the connector to establish electric connection therebetween. Then, the IC card contained in the holder is removed therefrom by depressing the eject button arranged near the loading slot because the IC card is pushed out of the eject mechanism under the pressure of the depressed eject button.

As pointed out above, when taking out the IC card contained in the holder, the user is required to depress the eject button connected to the loading apparatus by applying pressure that is large enough to cancel the engagement of the connection terminal of the IC card and the connector. The loading apparatus has a size substantially same as the IC card and hence the eject button is very small. Therefore, the eject button shows a poor operability when it is heavy.

BRIEF SUMMARY OF THE INVENTION

Therefore, it is the object of the present invention to provide a transfer apparatus that is free from the above identified problem of the related art.

According to the invention, the above object is achieved by providing a transfer apparatus for transferring a storage medium comprising:

a holder for holding a storage medium, said holder being adapted to move between a first position for loading and unloading said storage medium and a second position for containing said storage medium on the chassis of the apparatus;

a connector arranged in said holder and adapted to be connected to the terminal section of said storage medium when said holder is at said first position; and a restriction member for restricting the movement of said holder from said first position to said second position until said connector is connected to said terminal section.

In another aspect of the invention, there is also provided a transfer apparatus for transferring a storage medium comprising:

a holding means for holding a storage medium, said holding means being adapted to move between a first position for loading and unloading said storage medium and a second position for containing said storage medium on the chassis of the apparatus;

a connection means arranged in said holding means and adapted to be connected to the terminal section of said storage medium when said holding means is at said first position; and a restriction means for restricting the movement of said holding means from said first position to said second position until said connection means is connected to said terminal section.

In still another aspect of the invention, there is provided a transfer method for transferring a storage medium comprising the steps of:

inserting a storage medium into a holder;

restricting said holder to remain at a first position;

connecting the terminal section of said storage medium and the connector arranged in said holder;

cancelling said restriction on said holder at the time of said connection; and starting to move said holder holding said storage medium toward a second position for containing said holder upon the cancellation of said restriction.

In still another aspect of the invention, there is provided a transfer method for transferring a storage medium comprising the steps of:

inserting a storage medium into a holder;

connecting the terminal section of said storage medium and the connector arranged in said holder;

cancelling said restriction on said holder at the time of said connection; and starting to drive said holder holding said storage medium to move toward a second position for containing said holder upon the cancellation of said restriction.

In still another aspect of the invention, there is provided a transfer apparatus for transferring a storage medium comprising:

a connection means adapted to be connected to the terminal section of a storage medium; and a transfer means for transferring said storage medium from a first position to a second position under the condition where said connection means is connected to said terminal section.

In still another aspect of the invention, there is provided a transfer method for transferring a storage medium comprising steps of:

connecting a connection means to the terminal section of a storage medium; and transferring said storage medium from a first position to a second position under the condition where said connection means is connected to said terminal section.

With a loading apparatus according to the invention, the operation of inserting the storage medium into the holder and that of taking out the storage medium from the holder at the first position are carried out by the user because the holder is provided with a connector that is adapted to move integrally with the holder. Therefore, the force required to move the holder from the first position to the second position and mount the storage medium in position and the force required to move the storage medium from the second position to the first position where it is ready to be taken out can be minimized to the convenience of the user trying to insert or release the storage medium.

With a loading apparatus according to the invention, the restriction member makes the holder movable to a second position by releasing the restricting section and the engaging section of the chassis from the mutual engagement when the holder located at a first position is inserted into the storage medium holding section of the holder in a normal state where the terminal section of the storage medium is connectable to the connector of the holder. In other words, if the storage medium is inserted in an abnormal state, the restricting section and the engaging section are not released from the mutual engagement and hence the holder is prohibited from moving from the first position to the second position. As a result, the storage medium is prevented from being inserted in a wrong way.

DETAILED DESCRIPTION OF THE INVENTION

Now, the present invention will be described by referring to the accompanying drawing that illustrates a loading apparatus for loading a card-type memory device (to be referred to as IC card hereinafter) to which the present invention is applied.

Figure 1:
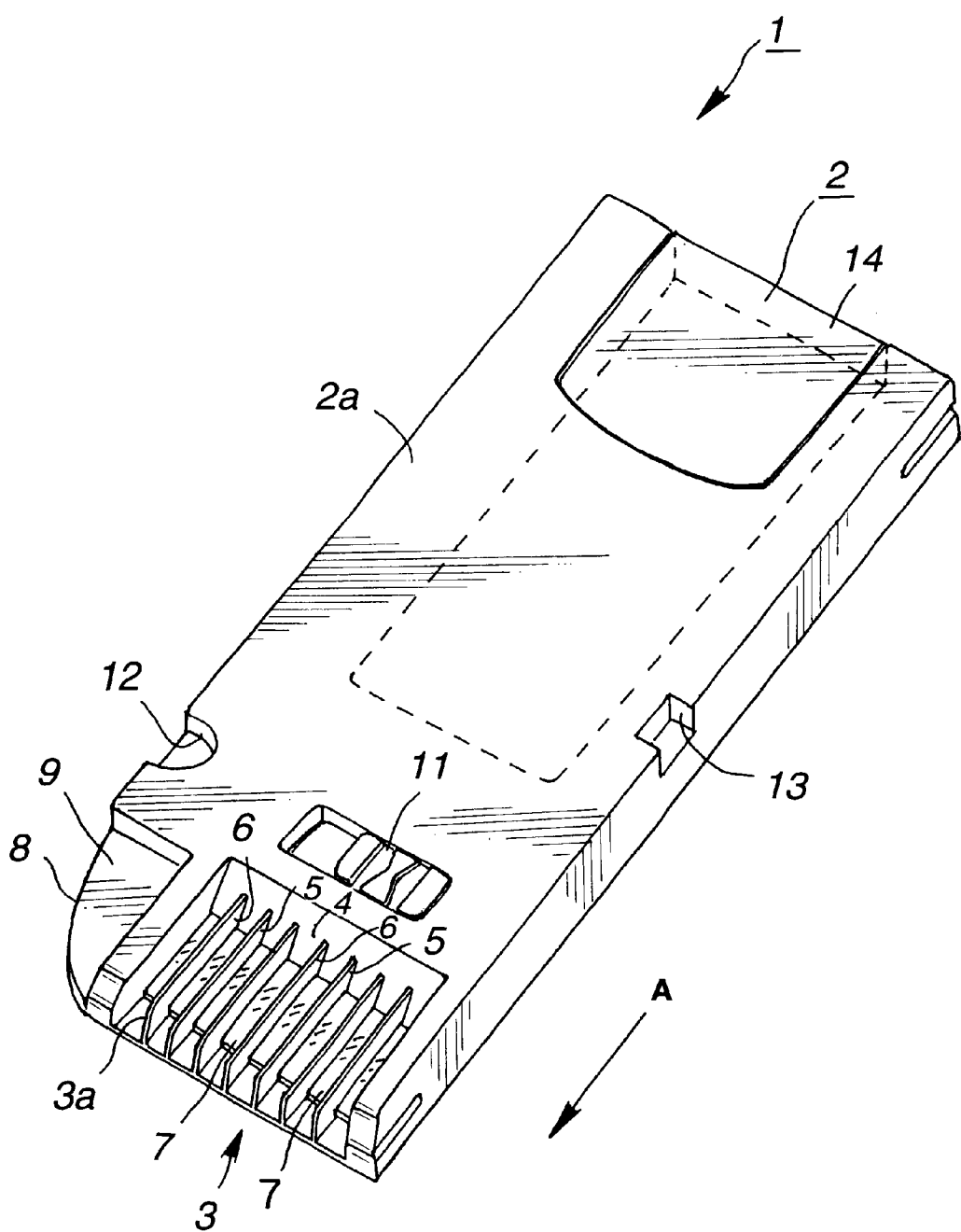
FIG. 1 is a schematic perspective view of an IC card that can be used with a loading apparatus to which the present invention is applied.

Referring to FIG. 1, an IC card 1 to be used with a loading apparatus to which the present invention is applicable is an external memory device adapted to be used typically for electronic equipment such as a computer, a video camera or a portable information terminal. The IC card 1 comprises a card main body 2 containing a semiconductor memory, a magnetic memory, an optical memory, a small optical disk, a magneto-optic disk or a hard disk (magnetic disk), which may be a flash memory for storing image signals, audio signals and information signals representing data to be processed by a computer.

The card main body 2 is formed to show an oblong and substantially rectangularly parallelepipedic profile. A terminal section 3 is formed at the front side of the card main body 2 that operates as leading edge of the IC card 1 when the card is inserted into the loading apparatus. Thus, the terminal section 3 will be held in contact with the connector arranged at the card holding section of the loading apparatus when the IC card 1 is mounted onto the loading apparatus.

The terminal section 3 has a plurality of engaging recesses 6 produced by separating a recess 4 formed at the front end and on one of the main surface 2a of the card main body 2 by means of so many partition walls 5 standing in parallel with the direction along which the card is inserted into the loading apparatus. Each of the engaging recesses 6 is provided on the bottom surface thereof with a terminal 7. Thus, the engaging recesses 6 are open at the front side and the main surface 2a of the card main body 2 so that the corresponding connection terminals of the connector of the card holding section of the loading apparatus can enter the respective engaging recesses 6 from the open side. Each of the partition walls arranged at the front end of the card main body 2 is provided with a sloped section 3a that allows the IC card 1 to be inserted smoothly. Thus, as the engaging recesses 6 of the terminal section 3 are provided on the bottom surface thereof with respective terminals 7, these terminals 7 are protected from being inadvertently touched by a finger tip.

One of the front corners of the card main body 2 is chamfered section 8 to show an arcuate profile. The chamfered section 8 is provided with a notch 9 at the side of the main surface 2a. All the remaining three corners of the card main body 2 is not chamfered and hence show an angle of about 90°. The notch 9 of the chamfered section 8 allows the insertion-failsafe member arranged at the rear side of the connector to be received there when the IC card 1 properly held in the card holding section of the loading apparatus so that the IC card 1 may be inserted into the card containing section without problem. The insertion-failsafe member of the card containing section abuts the corners not having the chamfered section 8 and the notched section 9 of the card main body 2 to prohibit the IC card 1 from being inserted when the IC card 1 is forced to move in from the rear side thereof.

One of the surfaces, or surface 2a of the card main body 1 is provided at a position near the terminal section 3 with a recording-failsafe switch 11 for preventing a wrong information signal from being recorded in the semiconductor memory. The recording-failsafe switch 11 is linked to an operating member in the card main body 2 in such a way that it permits an information signal to be recorded in the semiconductor memory of the card main body 2 when it is slidingly moved in a direction and prohibits any information signal from being recorded in the semiconductor memory when it is slidingly moved in the opposite direction. The card main body 2 is also provided at a position near the notch 9 on the related longitudinal lateral side thereof with an anti-fall recess 12 for preventing the IC card 1 from falling once it is inserted into the loading apparatus. More specifically, the anti-fall recess 12 prevents the IC card 1 from falling out of the card containing section of the loading apparatus as it is engaged with an anti-fall member of the card containing section. The card main body 2 is provided at the middle of the other longitudinal lateral side thereof with an engaging recess 13 for detecting an insertion error. The engaging recess 13 is adapted to be engaged with an engaging projection arranged at the card holding section of the loading apparatus. The card main body 2 is also provided on the rear side as opposed to the front side carrying the terminal section 3 with a label receiving section 14 where a label describing information relating to the information signals stored in the semiconductor memory is typically applied. Thus, an IC card 1 having the above described configuration is inserted into the loading apparatus along the direction of arrow A in FIG. 1 with its main surface 2a facing the chassis 21 of the loading apparatus and its front side operating as leading edge.

Figure 2:
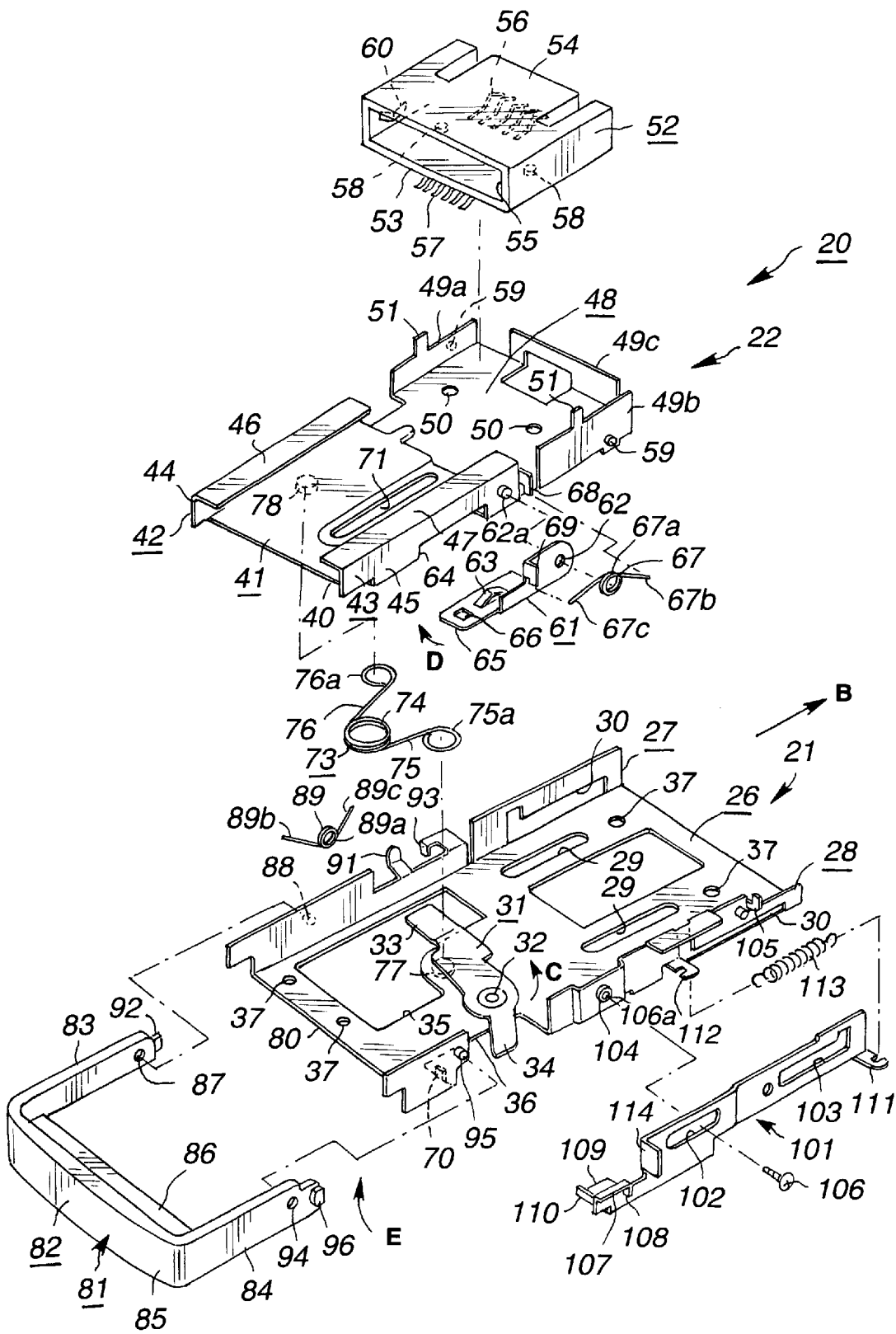
FIG. 2 is an exploded schematic perspective view of the loading apparatus of FIG. 1.
Figure 3:
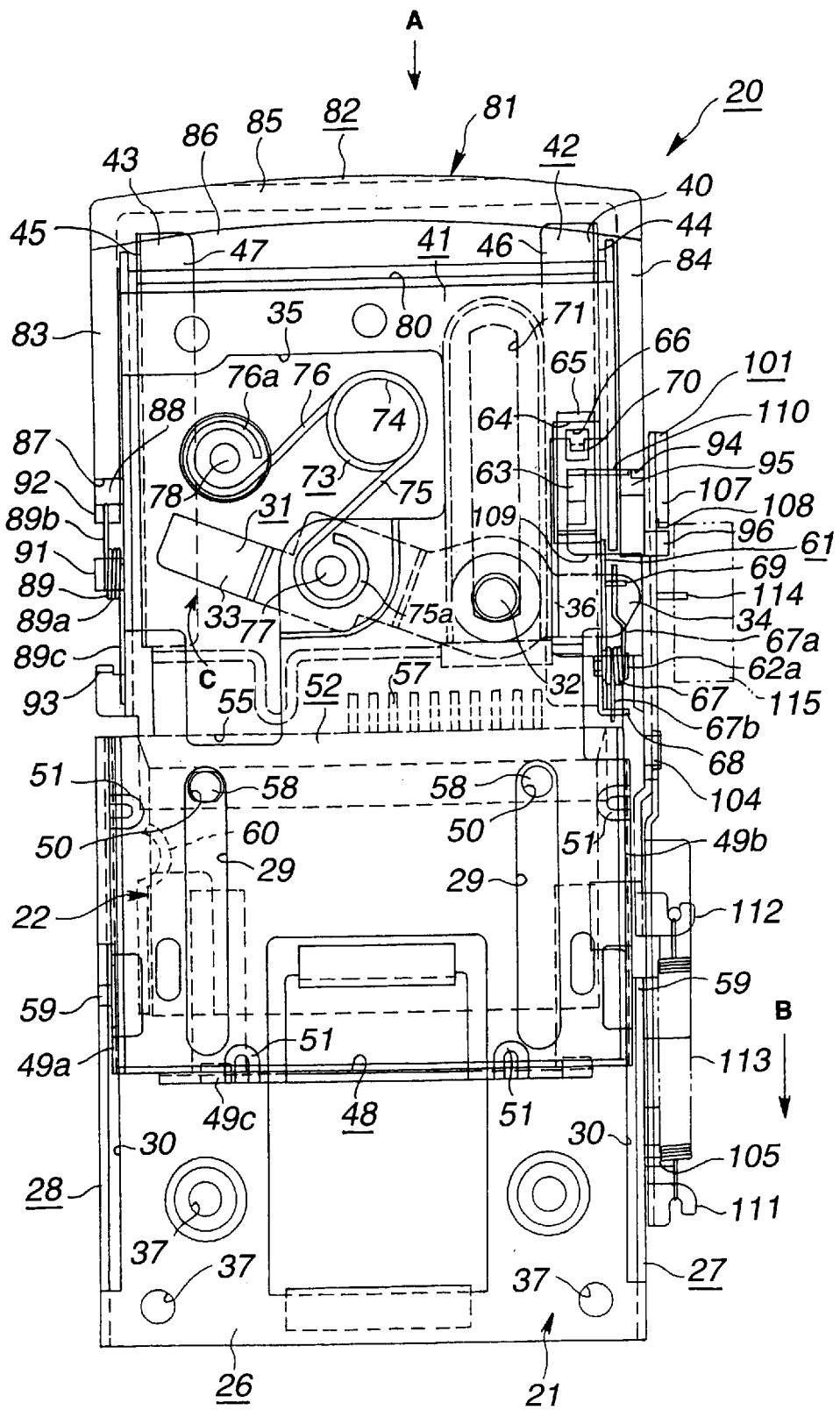
FIG. 3 is a schematic plan view of the loading apparatus of FIG. 1.

The loading apparatus 20 for loading an IC card 1 is normally arranged in electronic equipment such as a computer, a video camera or a portable information terminal and comprises a chassis 21 fitted to the cabinet of the apparatus main body and a holder 22 that is slidable relative to the chassis 21 and adapted to hold an IC card 1 as shown in FIGS. 2 and 3.

Referring to FIGS. 2 and 3, the chassis 21 is formed by punching out and bending a metal plate and comprises a substantially rectangularly parallelepipedic bottom plate 26 and first and second lateral walls 27, 28 standing from the bottom plate 26 and running longitudinally in parallel with each other to show a substantially U-shaped cross section. The holder 22 is arranged in the area defined by the bottom plate 26 and the first and second lateral walls 27, 28 and held movable in the direction of arrow B, which is same as the direction along which the IC card 1 is inserted, and the direction opposite to arrow B.

The bottom plate 26 for receiving the holder 22 has a substantially rectangularly parallelepipedic profile with a length same as that of the IC card 1 and provided at the rear side thereof with a pair of guide holes 29, 29 for guiding the holder 22 when the latter is moved. The guide holes 29, 29 are engaged with respective guide projections projecting from the bottom of the holder 22 to define the movable range of the holder 22. The first and second lateral walls 27, 28 are also provided with respective guide holes 30, 30 running in the moving direction of the holder 22 in order to guide the movement of the holder 22 and define its movable range.

As shown in FIGS. 2 and 3, a swing arm 31 is fitted to the front side of the bottom plate 26 through which the IC card 1 is inserted and adapted to slidingly push the holder 22 in the direction opposite to arrow B if the latter slides in the direction of arrow B. The swing arm 31 is held at a middle point thereof to a pivot 32 arranged at the bottom plate 26 and supported by the pivot 32 so as to be rotatable both in the direction of arrow C and in the direction opposite to arrow C in FIGS. 2 and 3. The swing arm 31 is a length equal to the distance separating the first and second lateral walls 27, 28 and provided at the end located close to the first lateral wall 27 with a pusher section 33 adapted to push the holder 22 in the direction opposite to arrow B in FIGS. 2 and 3 and at the other end located close to the second lateral wall 28 with a section 34 to be pushed by a corresponding pusher section of an eject member. The pusher section 33 arranged at an end of the swing arm 31 extends above the opening 35 formed through the bottom plate 26, whereas the section 34 to be pushed that is arranged at the other end of the swing arm 31 extends above the opening 36 formed through the bottom plate 26 of the chassis 21 and the second lateral wall 28.

As the section 34 to be pushed is actually pushed in the direction of arrow C by the operating part of the eject member as shown in FIGS. 2 and 3, the swing arm 31 rotates around the pivot 32 in the sense of arrow C to forwardly move the pusher section 33 at the other end thereof toward the front end of the chassis 21. As a result, the holder 22 located at the rear side of the chassis 21 is pushed by the pusher section 33 moving toward the front side of the chassis 21 to slide also toward the front side of the chassis 21 in the direction opposite to arrow B in FIGS. 2 and 3.

The bottom plate 26 is provided with a plurality of fitting holes 37 to be used for fitting the cabinet of the electronic equipment carrying the loading apparatus 20.

As seen from FIGS. 2 and 3, the holder 22 slidably fitted to the chassis 21 in a manner as described above has a size slightly smaller than the chassis 21 and is formed by bending a metal plate. The holder is provided with first and second card holding sections 42, 43 for holding the IC card 1, which card holding sections are arranged at the opposite lateral sides near the front side of the bottom plate 41. The first and second card holding sections 42, 43 are formed by perpendicularly bending the bottom plate 41 and comprise respectively lateral walls 44, 45 having a height corresponding to the thickness of the IC card 1 and support members 46, 47 formed by inwardly bending the front ends of the lateral walls 44, 45 and running in parallel with the bottom plate 41. An insertion/release port 40 through which the IC card 1 is inserted and released is formed at the front side of the holder where the first and second card holding sections 42, 43 are arranged on the bottom plate 41. The first and second card holding sections 42, 43 defines an open space therebetween so that, when the IC card 1 is held between the first and second card holding sections 42, 43, the user can see the label applied to the label receiving section 14 through the window that is formed in the cabinet. A connector fitting section 48 is formed at the rear side of the holder 22 so that the connector that is connected to the terminals 7 arranged at the leading edge of the IC card 1 is fitted thereto. More specifically, the connector fitting section 48 is formed by restriction walls 49a, 49b, 49c for defining the fitting position of the connector that are standing from the respective edges of the bottom plate 41 other than the front edge thereof and the bottom plate 41. The restriction walls 49a, 49b, 49c are provided respectively with connector anchoring members 51 for anchoring the connector to the connector fitting section 48. The bottom plate 41 taking part in forming the connector fitting section 48 is provided with a pair of positioning holes 50, 50 for positioning and fitting the connector.

As shown in FIGS. 2 and 3, the connector 52 to be fitted to the connector fitting section 48 comprises a terminal plate 53 for establishing connection between itself and the terminals 7 of the IC card 1 and a cover 54 fitted to the terminal plate 53 and showing a substantially U-shaped cross section.

As the cover 54 is fitted to the terminal plate 53 of the connector 52, a containing section for containing the front side of the IC card 1 is defined in the inside with an insertion port 55 formed at the front thereof, through which the IC card 1 having the terminal section 3 at the front end is inserted.

The cover is provided at a lateral wall thereof with a resilient engaging member 60 that operates as anti-fall member and becomes engaged with the anti-fall recess 12 of the IC card 1 when the IC card 1 is inserted. As the resilient engaging member 60 is engaged with the anti-fall recess 12 of the IC card 1, the IC card 1 is held inside the holder 22 so that the IC card mounted in the loading apparatus 1 is securely prevented from falling. When the resilient engaging member 60 is engaged with the anti-fall recess 12 of the IC card 1, it is resiliently deformed to give rise to a feeling of a click to the user and make the latter recognize that the IC card 1 is completely inserted into the holder 22. The resilient engaging member 60 also operates as insertion-failsafe member that prevents the IC card 1 from being inserted into the holder 22 when the card is not properly handled. The connector 52 may be provided on the rear wall of the cover 54 with an anti-fall member that is engaged with the chamfered section 8 and the notch 9 arranged at the rear surface of the IC card 1.

The terminal plate 53 that defines the bottom of the connector 52 is provided with first connection terminals 56 to be electrically connected to the terminal section 3 of the IC card 1 and second connection terminals 57 to be connected to a flexible printed wiring board that is by turn to be connected to a printed wiring board comprising electric circuits including at least a signal processing circuit. The number of the first connection terminals 56 corresponds to that of the terminals 7 of the terminal section 3 of the IC card 1. Each of the first connection terminals 56 has a substantially L-shaped profile with the bent section projecting upward in such a way that it will be resiliently deformed as it is pushed by the corresponding one of the terminals 7 of the IC card 1. As the IC card 1 is inserted. the first connection terminals 56 are moved into the terminal section 3 of the IC card 1 through the open side thereof and pressed against the corresponding respective terminals 7 so that they become electrically connected with the respective terminals 7.

The second connection terminals 7 are connected to a flexible printed wiring board that is by turn to be connected a printed wiring board comprising electric circuits including at least a signal processing circuit. In other words, the IC card 1 whose terminal section 3 is electrically connected to the first connection terminals 56 is controlled by the signal processing circuit that is arranged on the printed circuit board by way of the flexible printed circuit board that electrically connects the second connection terminals 57 and the printed circuit board arranged in the cabinet. The second connection terminals 57 are arranged near the insertion port 55 so that it may be connected easily to the flexible printed circuit board. The flexible printed circuit board is so formed as to have a length that allows the holder 22 to move between the first position at the front side of the chassis 21 and the second position at the rear side of the chassis 21. The terminal plate 53 of the connector 52 that is provided with the first connection terminals 56 and the second connection terminals 57 in a manner as described above is further provided on the rear surface thereof with a pair of positioning projections 58, 58 for positioning and fitting the connector 52 to the connector fitting section 48 arranged on the bottom plate 41 of the holder 22.

More specifically, the connector 52 formed by fitting the cover 54 to the terminal plate 53 is fitted to the connector fitting section 48 by bringing the positioning projections 58, 58 of the terminal plate 53 into engagement with the corresponding respective positioning holes 50, 50 cut through the connector fitting section 48 of the bottom plate 41 and bending the connector anchoring members 51 formed respectively at the front ends of the restriction walls 49a, 49b, 49c anchor the connector 52 to the connector fitting section 48. The positioning projections 58, 58 formed on the terminal plate 53 are made to pass through the respective positioning holes 50, 50 cut through the bottom plate 41 and project from the bottom plate 41 of the holder 22 until the projecting parts thereof come into engagement with the respective guide holes 29, 29 formed in the chassis 21 so that they operate also as guide projections when moving the holder relative to the chassis 21.

The restriction walls 49a, 49b running in parallel with the lateral walls 44, 45 of the holder 22 and operating as part of the connector fitting section 48 are provided on the outer surfaces thereof respectively with guide projections 59, 59 that are engaged with the guide holes 30, 30 respectively cut through the first and second lateral walls 27, 28 of the chassis 21 as shown in FIG. 3. Additionally, the bottom plate 41 of the holder 22 is provided with a guide hole 71 running in the moving direction of the holder 22. The guide hole 71 is adapted to be engaged with the pivot 32 of the swing arm 31 that is fitted to the bottom plate 26 of the chassis 21. In other words, the pivot 32 also operates as guide projection when the holder 22 is moved relative to the chassis 21.

As shown in FIGS. 2 and 3, a restriction member 61 for restricting the movement of the holder relative to the chassis 21 is rotatably fitted to the lateral wall 45 of the second card holding section 43 of the holder 22. More specifically, the restriction member 61 is provided at the base side thereof with a pivot hole 62, through which pivot 62a standing from the lateral wall 45 of the holder 22 runs, so that the restriction member 61 is rotatable both in the sense of arrow D and in the sense opposite to arrow D in FIG. 4.

The restriction member 61 is also provided at the front side thereof with an engaging projection 63 to be engaged with the engaging recess 13 of the IC card 1 when the latter is inserted into the holder 22. The engaging projection 63 is made to face the inside of the holder 22 through an opening 64 formed through the bottom plate 41 and the lateral wall 45 of the holder 22 so that it may become engaged with the engaging recess 13 of the IC card 1 held by the holder 22 without obstruction. The restriction member 61 is additionally provided at a position closer to the front end thereof than the engaging projection 63 with an anchoring section 65 to be anchored to the rear surface side of the peripheral edge of the opening 64 formed through the bottom plate 41 and the lateral wall 45 of the holder in order to restrict the rotatable range of the restriction member 61 in the sense of arrow D in FIG. 4. The restriction member 61 is further provided with a restriction hole 66 to be engaged with engaging projection 70 that is arranged near the opening 36 of the bottom plate 26 of the chassis 21 when the holder is secured in position so as to be slidable relative to the chassis 21. As the restriction hole 66 is engaged with the engaging projection 70 formed on the chassis 21, it prohibits the holder 22 against sliding from the first position located at the front side of the chassis 1 to the second position located at the rear side of the chassis 21. In other words, when an IC card 1 is inserted into the holder located at the first position, the terminal section 3 of the IC card 1 will be reliably connected to the first connection terminals 56 because the holder 22 is locked to the first position by the restriction member 61.

Figure 4:
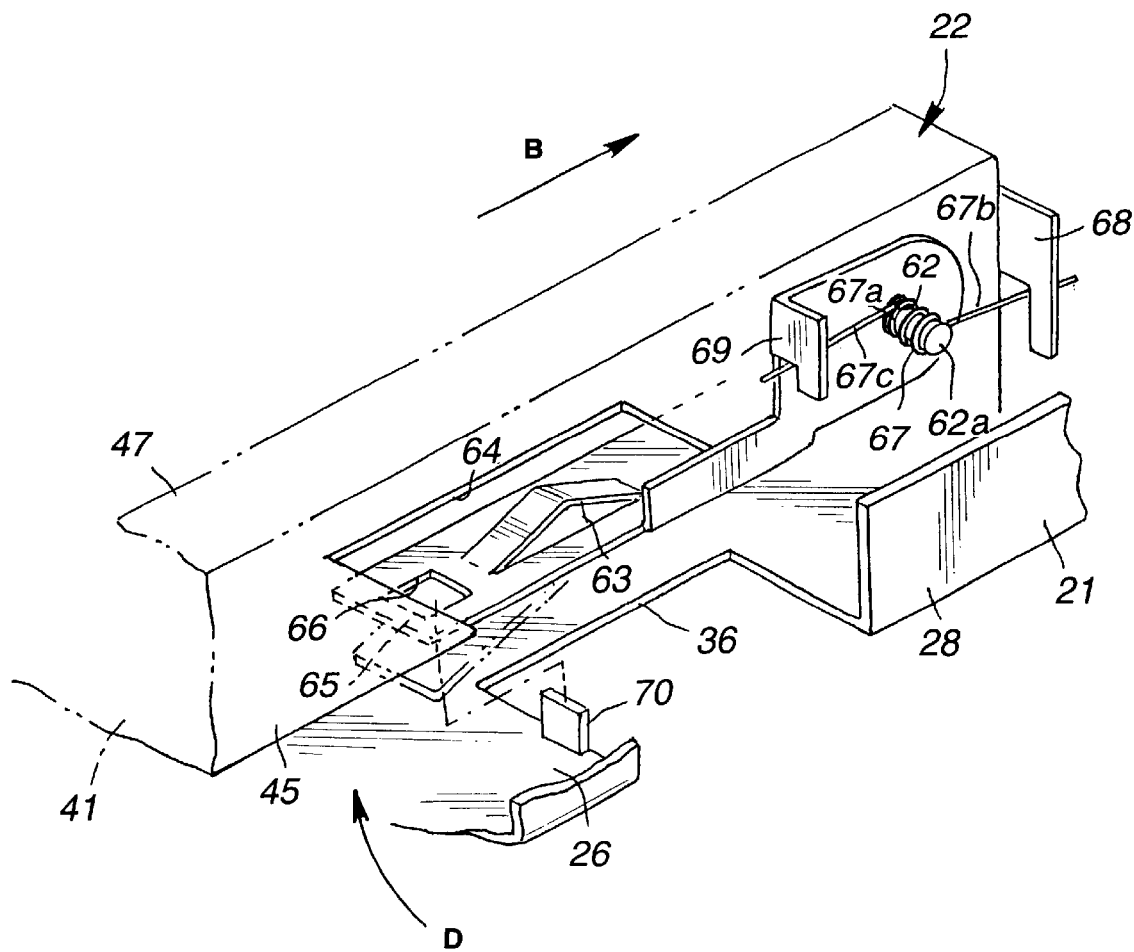
FIG. 4 is a schematic perspective view of a principal portion of the loading apparatus of FIG. 1, illustrating how the restriction means is fitted to the holder of the loading apparatus.

The restriction member 61 having the above described configuration is urged in the sense of arrow D in FIG. 4 and hence toward the inside of the holder 22 by means of a torsion spring 67 that is an urging member. The base section 67a of the torsion spring 67 is fitted onto the pivot 62a standing from the lateral wall 45 of the holder 22 from above the restriction member 61. One of the arm sections of the torsion spring 67, or the arm 67b, is anchored to anchoring part 68 formed on the lateral wall 45 of the holder 22, whereas the other arm, or the arm 67c, is anchored to anchoring part 69 formed on the restriction member 61. With this arrangement, the torsion spring 67 urges the restriction member 61 in the sense of arrow D in FIG. 4. Thus, the restriction member 61 is fitted to the lateral wall 45 with its anchoring section 65 at the front end thereof anchored to the rear surface side of the bottom plate 41 at a position near the opening 64 and its engaging projection 63 facing the inside of the holder through the opening 64.

Thus, with the holder 22 having the above described configuration, the guide projections 59, 59 arranged on the restriction walls 49a, 49b of the connector fitting section 48 are engaged respectively with the guide holes 30, 30 of the chassis 21, while the positioning projections 58, 58 of the terminal plate 53 fitted to the connector fitting section 48 are engaged respectively with the guide holes 29, 29 of the chassis 21 as shown in FIGS. 2 and 3. Additionally, as the pivot 32 of the swing arm 31 located on the chassis 21 is engaged with the guide hole 71 cut through the bottom plate 41 of the holder 22, the holder 22 is slidably arranged between the first and second lateral walls 27, 28 of the chassis 21. Then, the holder 22 is made slidable between the first position located at the front side of the chassis 21 where the IC card 1 is inserted/released and the second position located at the rear side of the chassis 21 where data can be written on or read from the semiconductor memory in the IC card 1. Thus, the IC card 1 is inserted/released when the holder 22 is at the first position and information signals are written on or read from the semiconductor memory in the IC card 1 when the holder 22 is at the second position.

The chassis 21 and the holder 22 are connected to each other by means of a toggle spring 73 that is an urging member as shown in FIGS. 2 and 3. The toggle spring 73 comprises a coil section 74 formed by winding a wire, a first arm section 75 extending from an end of the coil section 74 and a second arm section 76 extending from the other. end of the coil section 74. A first engaging section 75a to be engaged with the chassis 21 is formed at the front end of the first arm section 75, while a second engaging section 76a to be engaged with the holder 22 is formed at the front end of the second arm section 76. The first engaging section 75a is engaged with first engaging projection 77 formed on the rear side of the bottom plate 26 of the chassis 21, while the second engaging section 76a is engaged with second engaging projection 78 formed on the rear surface of the bottom plate 41 of the holder 22.

The toggle spring 73 connecting the chassis 21 and the holder 22 in a manner as described above is found in a first state of urging the holder in the direction opposite to arrow B in FIGS. 2 and 3 when the holder 22 is at the first position located close to the front side of the chassis 21. As the holder 22 is driven to slide relative to the chassis 21 in the direction of arrow B in FIGS. 2 and 3, the toggle spring 73 is turned to a second state of urging the holder 22 in the direction of arrow B in FIGS. 2 and 3 and drive the holder 22 to the second position located close to the rear side of the chassis 21. As the swing arm 31 fitted to the bottom plate 26 of the chassis 21 is turned in the sense of arrow C in FIG. 3 while the holder 22 is at the second position, the pusher section 33 formed at an end of the swing arm 31 pushes the second engaging projection 78 of the holder 22. Then, the toggle spring 73 held in the second state receives the pressure of the pusher section 33 of the swing arm 31 trying to push the second engaging projection 78 of the holder 22 so that the holder 22 is driven to slide in the direction opposite to arrow B in FIG. 3 and the toggle spring 73 is turned to the second state of urging the holder 22 in the direction opposite to arrow B in FIG. 3 and drives the holder 22 to move to the first position.

As described above, the holder 22 is slidably fitted to the chassis 21 with the IC card 1 insertion/release port 40 arranged at the front side thereof and a lid 80 is rotatably fitted to the chassis 21 in order to close and open the front side of the chassis 21. As shown in FIGS. 2, 3, 5 and 6, the lid 81 comprises a closure plate 82 for closing the insertion/release port 40 and the front side of the chassis 21 and first and second swing/support arms 83, 84 formed at the opposite sides of the closure plate 82.

The closure plate 82 has a first closure section 85 for closing the insertion/release port 40 of the holder and the front side of the chassis 21 and a second closure section 85 to be fitted into a notch 80 formed at the front side of the bottom plate 26 of the chassis 21.

Figure 5:
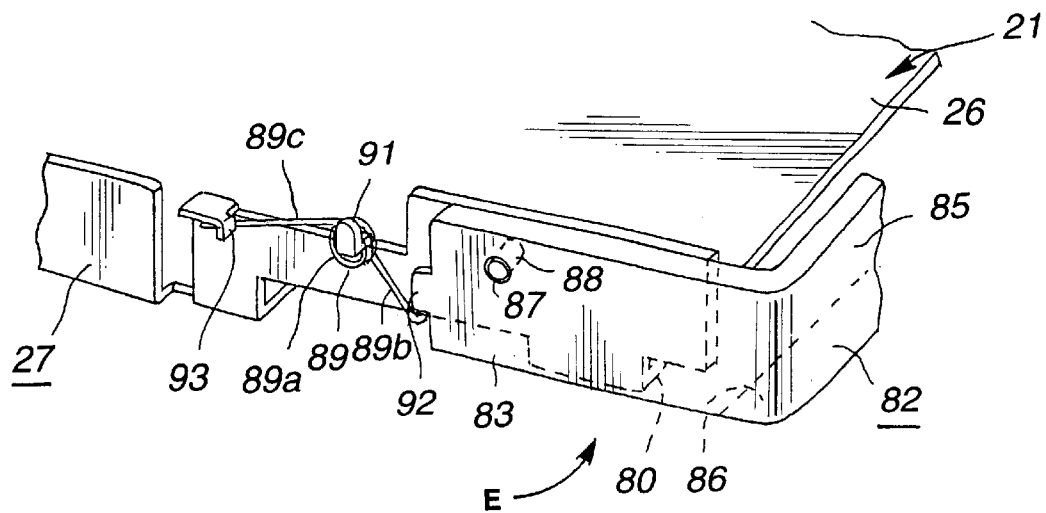
FIG. 5 is a schematic perspective view of a principal portion of the loading apparatus of FIG. 1, illustrating how the lid is fitted to the chassis.

The first swing/support arm 83 arranged at the side of the first lateral wall 27 of the chassis 21 is provided at the front end thereof with a first support hole 87 for rotatably supporting the lid 81 as shown in FIG. 5. The first support hole 87 is engaged with a first pivot 88 arranged at the front side of the first lateral wall 27 of the chassis 21. The lid 81 is urged to turn in the sense of arrow E in FIG. 6 by means of a torsion spring 89 that is an urging member located at the side of the first swing/support arm 83. The torsion spring 89 is engaged at a base section 89a thereof with an engaging member 91 formed on the first lateral wall 27 of the chassis 21. The torsion spring 89 has a pair of arm sections 89b, 89c, of which the arm section 89b is engaged with an engaging section 92 formed at the front end of the first swing/support arm 83, whereas the arm section 89c is engaged with an engaging section 93 formed on the first lateral wall 27 so that the lid 81 is consequently urged to turn in the sense of arrow E in FIG. 6.

Figure 6:
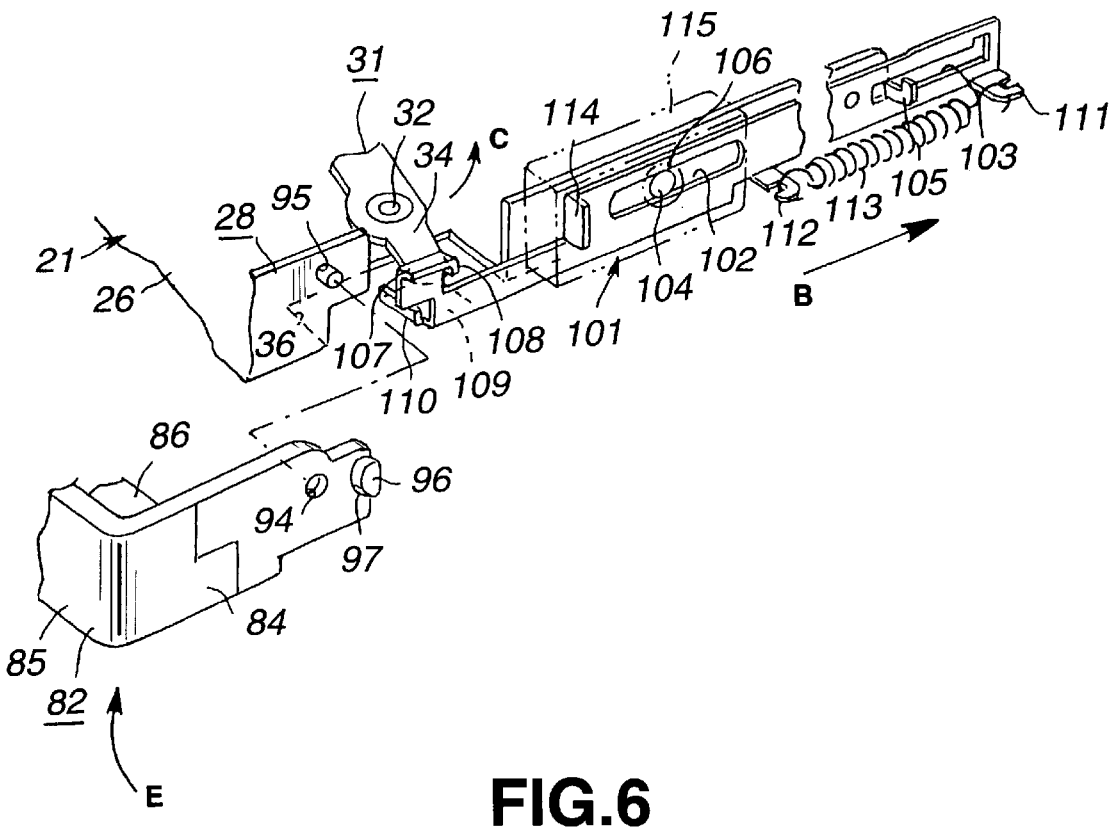
FIG. 6 is a schematic perspective view of a principal portion of the loading apparatus of FIG. 1, illustrating how the eject member is fitted to the chassis.

On the other hand, the second swing/support arm 84 arranged at the side of the second lateral wall 28 of the chassis 21 is provided at the front end thereof with a second support hole 94 that cooperates with the first support hole 87 to rotatably support the lid 81 as shown in FIG. 6. The second support hole 94 is engaged with a second pivot 95 arranged at the front side of the second lateral wall 28 of the chassis 21. The second support/swing arm 84 is provided at the front end thereof with a projection 96 that is pushed by the eject member to turn the lid 81 in the sense of arrow E in FIG. 6. An inclined surface section 97 is formed on the lower side of the projection 96 to allow the cam section of the eject member to contact easily with the closure plate 82.

The lid 81 having the above described configuration is supported in such a way that it can turn around the first and second pivots 88, 95 both in the sense of arrow E and in the sense opposite to arrow E as the first and second support holes 87, 94 are engaged respectively with the first and second pivots 88, 95 as shown in FIGS. 5 and 6. Thus, the lid 81 is urged to turn in the sense of arrow E in FIGS. 5 and 6 and close the front side of the chassis 21 by the urging force of the torsion spring 89. Then, as the inclined surface section 97 of the projection 89 formed on the second swing/support arm 84 is pushed by the cam section of the eject member, the lid 81 is turned around the first and second pivots 88, 95 in the sense of arrow E in FIGS. 5 and 6 to open the front side of the chassis 21 and the insertion/release port 40 of the holder 22.

The second lateral wall 28 of the chassis 21 is provided with an eject member 101 for moving the holder 22 from the second position located at the rear side of the chassis 21 to the first position located at the front side of the chassis 21 by means of the toggle spring 73 linking the chassis 21 and the holder 22. The eject member 101 is fitted to the second lateral wall 28 in such a way it is slidable both in the direction of arrow B and in the direction opposite to arrow B in FIG. 6. As seen from FIG. 6, the eject member 101 has a width substantially equal to the height of the second lateral wall 28 of the chassis 21 and is formed by punching a metal plate to show an oblong and substantially rectangularly parallelepipedic profile. The eject member 101 is provided with a first guide hole 102 and a second guide hole 103 that are arranged longitudinally. The first guide hole 102 is engaged with a guide projection 104 formed on the second lateral wall 28 of the chassis 21, while the second guide hole 103 is engaged with a guide member 105 formed also on the second lateral wall 28. The eject member 101 is fitted to the second lateral wall 28 as anchor screw 106 is driven into the first guide hole 102 and the screw hole 106 formed through the guide projection 104 of the second lateral wall 28.

Additionally, the eject member 101 is urged in the direction opposite to arrow B in FIG. 6 by means of a tensile spring 113 that is also an urging member as shown in FIG. 6. The tensile spring 113 is anchored at an end thereof to spring anchoring part 111 formed at an end of the eject member 101 facing the rear side of the chassis 21 and at the other end to spring anchoring part 112 formed on the chassis 21 at the middle of the longitudinal span of the second lateral wall 28 so that the eject member 101 is urged in the direction opposite to arrow B in FIG. 6.

The eject member 101 fitted to the second lateral wall 28 of the chassis 21 in a manner as described above is provided at the end thereof located near the front side of the chassis 21 with a cam section 107 that is bent so as to become parallel with the bottom plate 26 of the chassis 21 and adapted to push the projection 95 formed on the second swing/support arm 84 of the lid 81. Thus, the cam section 107 faces the inside of the chassis 21 through the opening 36 formed through the bottom plate 26 of the chassis 21. Then, the cam section 107 is further provided at the side located near the rear side of the chassis 21 with a bent section 108 bent downwardly and adapted to easily push the inclined surface section 97 formed on the lower side of the projection 96 arranged on the second swing/support arm 84 of the lid 81.

Additionally, the eject member 101 is provided at the end thereof located close to the front side of the chassis 21 with an operating part 109 that is bent so as to run in parallel with the bottom plate 26 of the chassis 21 so that it pushes the section 34 to be pushed formed on the other end of the swing arm 31 toward the rear side of the chassis 21 in the sense of arrow C in FIG. 6. The operating part 109 is by turn provided at the end thereof located close to the front side of the eject member 101 with a pusher section 110 that is bent upward. The pusher section 110 of the operating part 109 faces the inside of the chassis 21 through the opening 36 cut through the bottom plate 26 of the chassis 21 and becomes engaged with the section 34 to be pushed of the swing arm 31.

Still additionally, the eject member 101 is provided near the end thereof with an operating part 114 that is bent so as to be operated by ejecting/operating section 115 located outside of the cabinet of the apparatus main body (not shown). The ejecting member 101 is driven to slide in the direction of arrow B in FIG. 6 as the operating part 114 is moved to slide in that direction.

Thus, as described above, the eject member 101 is pushed in the direction of arrow B in FIG. 6 when the holder 22 is in the second position located close to the rear side of the chassis 21. As a result, the eject member 101 slides in the direction of arrow B in FIG. 6 against the urging force of tensile spring 113 that urges the eject member 101 in the direction opposite to arrow B in FIG. 6. As the eject member 101 slides in the direction of arrow B, it pushes the inclined surface section 97 formed on the lower side of the projection 96 arranged on the second swing/support arm 84 of the lid 81 to consequently turn the lid 81 in the sense opposite to arrow E in FIG. 6 to open the insertion/release port 40 of the holder 22 against the urging force of the torsion spring 89. At the same time, the pusher section 110 formed at the operating part 109 pushes the section 34 to be pushed of the swing arm 31 in the sense of arrow C in FIG. 6 to consequently turn the swing arm 31 in that sense. Then, the pusher section 33 formed at an end of the swing arm 31 pushes the second engaging projection 78 of the holder 22 to drive the holder 22 to slide in the direction opposite to arrow B in FIG. 3. As a result, the holder 22 slides in the direction opposite to arrow B in FIG. 3 under the effect of the pushing force of the pusher section 33 of the swing arm 31 pushing the second engaging projection 78 of the holder 2. As the holder 22 slides in the direction opposite to arrow B, the toggle spring 73 turns back to the first state where it urges the holder 22 in the direction opposite to arrow B in FIG. 3 and drives the holder to move back to the first position.

Now, the sequence of operation of the IC card 1 from the time when it is inserted into the loading apparatus 20 down to the time when information signals are recorded in or reproduced from the semiconductor memory it contains will be described below. Firstly, when the loading apparatus 20 is not in use, the holder 22 is located at the first position close tot he front side of the chassis as shown in FIG. 3 and the toggle spring 73 connecting the chassis 21 and the holder 22 is in the first state where it urges the holder 22 to the first position close to the front side of the chassis 21.

On the other hand, the lid 81 is urged to turn in the sense of arrow E in FIGS. 5 and 6 by the urging force of the torsion spring 89 anchored to the anchoring section 92 of the lid 81 and the anchoring section 93 of the chassis 21 to close the front side of the chassis 21 and the insertion/release port 40 of the holder 22 that is in the first state. Thus, the lid 81 prevents dust from entering the loading apparatus 20 through the insertion/release port 40 of the holder 22.

The swing arm 31 is turned in the sense of arrow C in FIG. 3 so as to be located close to the front side of the chassis 21. The restriction member 61 fitted to the first lateral wall 27 of the chassis 21 is urged to turn in the sense of arrow D in FIG. 4 by the torsion spring 67 having one of its arms, or the arm 67b, anchored to the anchoring part 68 formed on the lateral wall 45 and its other arm 67c anchored to the anchoring part 69 formed on the swing arm 31 as shown in FIG. 4. The restriction member 61 has its anchoring section 65 at the front end thereof anchored to the rear surface of the bottom plate 41 of the holder 22 at a position near the opening 64, its engaging projection 63 formed near the front end facing the inside of the holder 22 and its restriction hole 66 engaged with the engaging projection 70 formed on the bottom plate of the chassis 21. Thus, the restriction hole 66 of the restriction member 61 of the holder 22 is not engaged with the engaging projection 70 of the chassis 21 and hence is movable in the direction of arrow B in FIG. 3 toward the rear side of the chassis 21.

The eject member 101 is slidingly moved in the direction opposite to arrow B in FIGS. 3 and 4 toward the front side of the chassis 21 by the tensile spring 113 anchored to the spring anchoring part 111 of the eject member 101 and the spring anchoring part 112 of the chassis 21.

Figure 7:
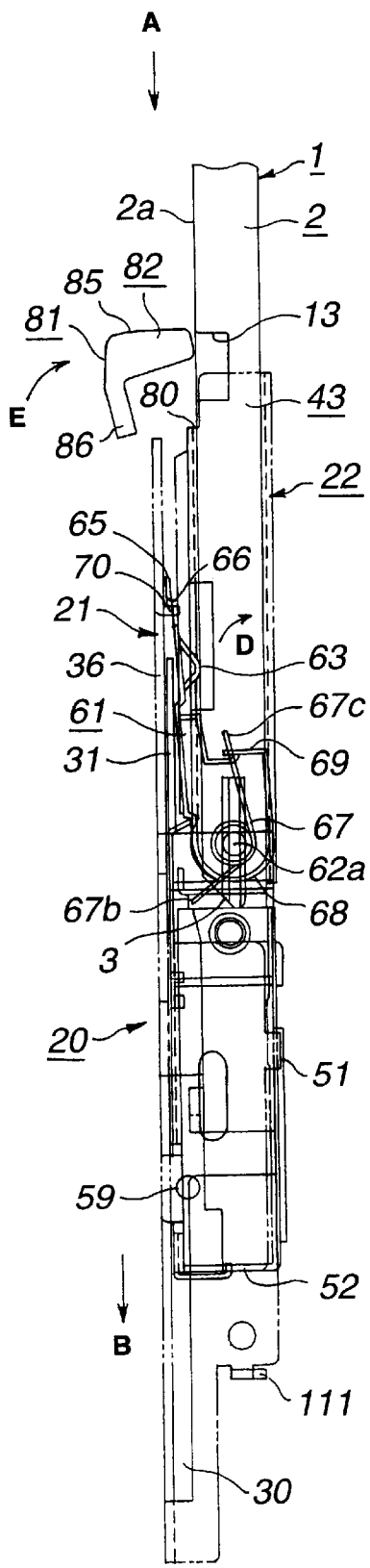
FIG. 7 is a schematic lateral view of the loading apparatus of FIG. 1, illustrating how an IC card is inserted into it.

Then, as shown in FIG. 7, an IC card 1 is inserted into the loading apparatus 20 that is not in use with its front side carrying the terminal section 3 operating as leading edge and its main surface 21 facing downward vis-a-vis the bottom plate 26 of the chassis 21. When inserting the IC card 1 into the loading apparatus from the front side of the latter, the lid 81 is turned in the sense opposite to arrow E in FIGS. 5 and 6 by means of a finger tip or by hooking it with the front end of the IC card 1 in order to open the insertion/release port 40 of the holder 22 that is in the first position and located close to the front side of the chassis against the urging force of the torsion spring 89 urging the lid 81 in the direction of arrow E in FIGS. 5 and 6 to close the front side of the chassis 21.

As the lid 81 is moved to open the front side of the chassis 21, the IC card 1 is inserted through the insertion/release port 40 of the holder 22 with its front end carrying the terminal section 3 operating as leading edge as shown in FIG. 7. Then, as the IC card 1 is moving in the direction of arrow B in FIG. 7 with its region defined by its front side and the engaging recess 13 formed on the main surface 2a moving on the restriction member 61 facing the inside of the holder 22 as shown in FIGS. 1 and 7, the restriction member 61 is turned in the sense opposite to arrow D in FIG. 7 around the pivot 62a against the urging force of torsion spring 67 because the engaging projection 63 of the restriction member 61 facing the inside of the holder 22 is pressed by the region defined by the front end and the engaging recess 13 formed on the main surface 2a of the IC card 1. As the restriction member 61 is turned in the sense opposite to arrow D in FIG. 7, the restriction hole 66 of the restriction member 61 becomes engaged with the engaging projection 70 of the chassis 21 as shown in FIGS. 4 and 7 and the holder 22 at the first position located close to the front side of the chassis 21 is prohibited from sliding in the direction of arrow B in FIG. 7 toward the rear side of the chassis 21 by the effect of the insertion of the IC card 1. The holder 22 is locked to the first position by the restriction member 61 until the terminal section 3 of the IC card 1 becomes connected to the first connection terminals 56 of the connector 52 of the holder 22 so that the terminals 7 of the terminal section 3 is reliably connected to the first connection terminals 56 of the connector 52.

Figure 8:
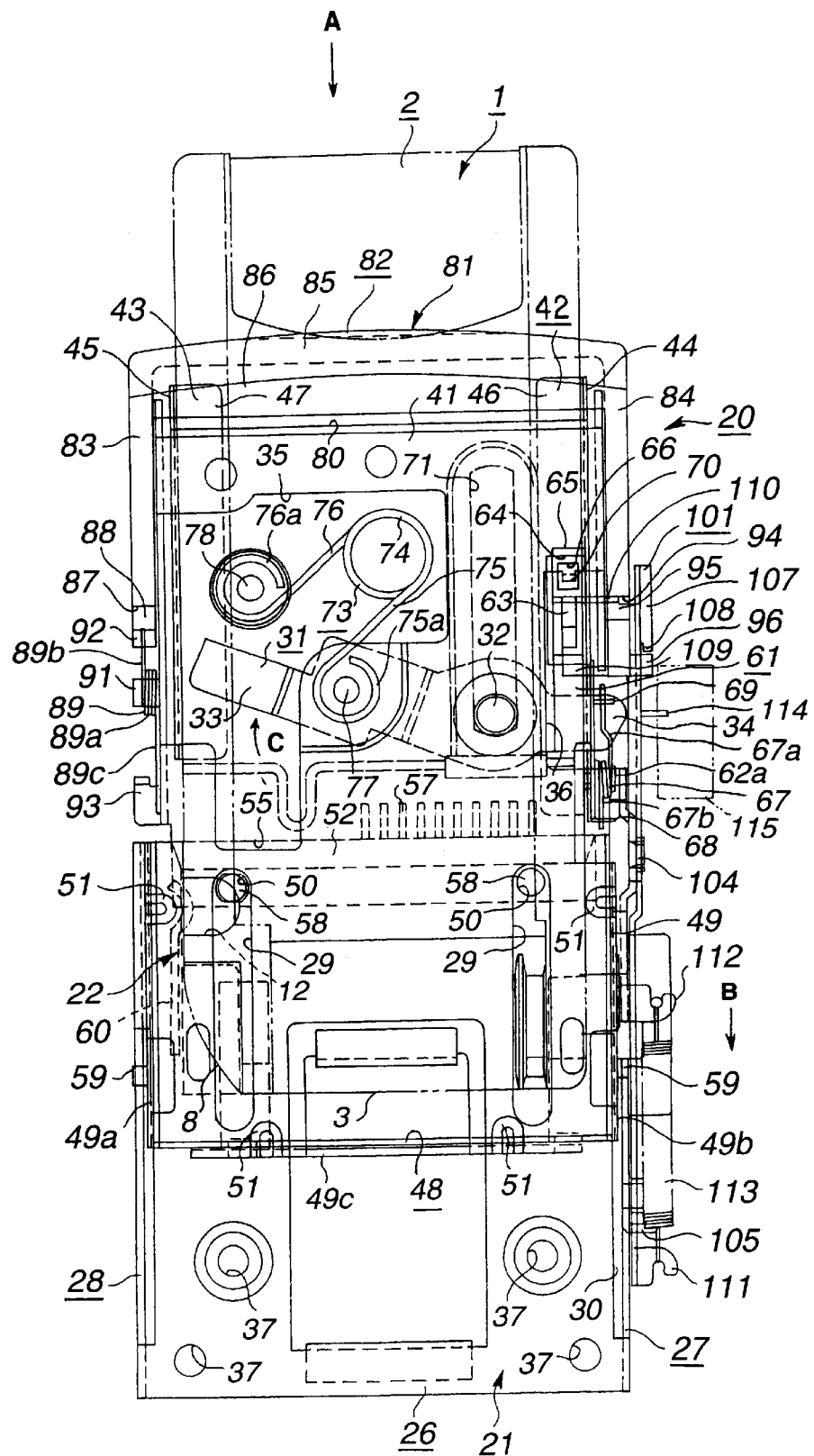
FIG. 8 is a schematic plan view of the loading apparatus of FIG. 1, illustrating the state where the IC card is completely inserted into the holder held to the first position located at the front side of the chassis.
Figure 9:
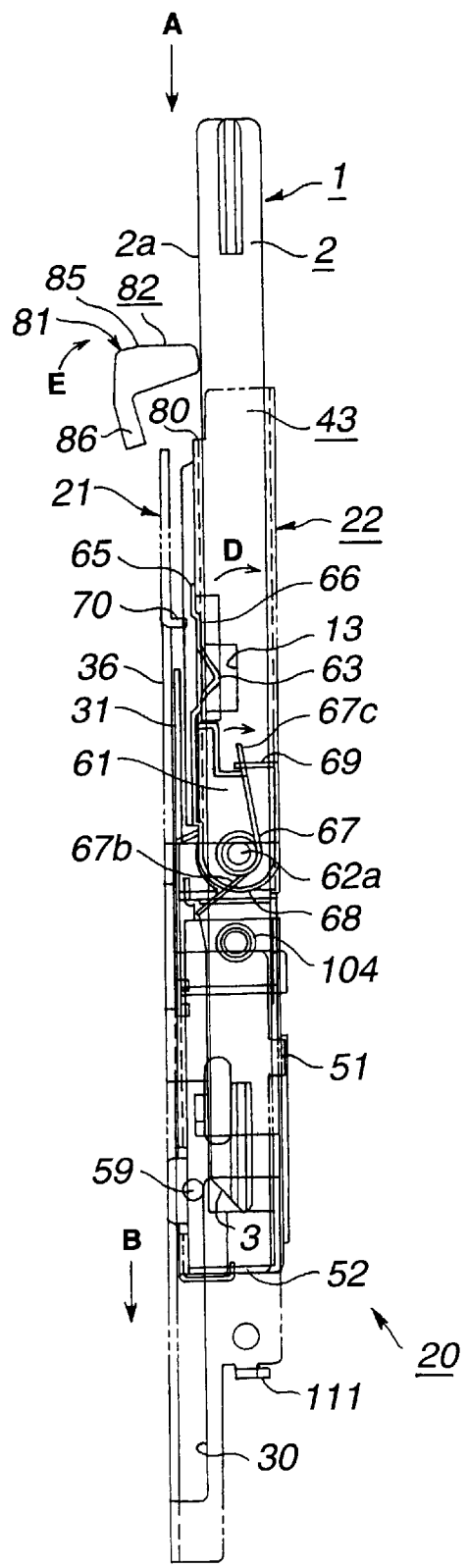
FIG. 9 is a schematic lateral view of the loading apparatus of FIG. 1, illustrating the state where the IC card is completely inserted in the holder held to the first position located at the front side of the chassis.

FIGS. 8 and 9 shows the state of the loading apparatus when the IC card 1 is further moved into the loading apparatus 20. Referring to FIGS. 8 and 9, as the IC card 1 is completely inserted into the holder 22 while the holder 22 is at the first position located close to the front side of the chassis 21, the IC card 1 is moved into the connector 52 located at the rear side of the holder 22 through the insertion port 55 of the connector 52. Then, the first connection terminals 56 of the connector become engaged with the corresponding respective engaging recesses 6 of the terminal section 3 of the IC card 1 through the open end thereof to push the corresponding respective terminals 7 in order to establish electric connection with them.

When the first connection terminals 56 are engaged with the corresponding respective engaging recesses 6 and electrically connected with the corresponding respective terminals 7, the engaging recess 13 of the IC card 1 is located above the engaging projection 63 of the restriction member 61 in the holder 22. Then, the restriction member 61 whose engaging projection 63 is pressed by a region of the IC card 1 extending between the front end and the engaging recess 13 and which is used to be urged to turn in the direction opposite to arrow D in FIG. 9 comes to be urged to turn in the direction of arrow D in FIG. 9 by the torsion spring 67 as the engaging recess 13 of the IC card 1 and the engaging projection 63 of the restriction member 61 are in a state where they can be engaged with each other. Thus, the engaging projection 63 comes to be engaged with the engaging recess 13 of the IC card 1. As a result, the restriction hole 66 of the restriction member 61 and the engaging projection 70 of the chassis 21 are released from the mutual engagement and the holder becomes slidable in the direction of arrow B in FIGS. 8 and 9 toward the second position located close to the rear side of the chassis 21. Additionally, when the IC card is completely inserted into the holder 22, the resilient engaging member 60 arranged on the connector 52 becomes engaged with the anti-fall recess 12 of the IC card 1 to prevent the IC card 1 from falling out as shown in FIG. 2. Still additionally, when the resilient engaging member 60 is engaged with. the anti-fall recess 12 of the IC card 1, it is resiliently deformed to give rise to a feeling of a click to the user and make the latter recognize that the IC card 1 is completely inserted into the holder 22 and the terminal section 3 and the first connection terminals 56 are reliably engaged with each other.

If the IC card 1 is not properly inserted into the loading apparatus 20, for instance if the IC card 1 is inserted through the insertion/release port 40 from the rear side or with its main surface 21 facing upward, the engaging projection 63 of the restriction member 61 would not become engaged with the engaging recess 13 of the IC card 1 even if the IC card 1 is inserted into the holder 22 that is found at the first position. In other words, if the IC card is inserted to the position as shown in FIGS. 8 and 9 under this condition, the engaging recess 13 of the IC card 1 is not found above the engaging projection 63 of the restriction member 61 in the holder 22 so that the restriction member 63 remains in a state where the engaging projection 63 is pressed by the main surface of the IC card 1 and the restriction hole 66 of the restriction member 63 remains in a state where it is engaged with the engaging projection 70 of the chassis 21. Therefore, the holder 22 at the first position is prohibited from sliding in the direction of arrow B in FIG. 7 toward the rear side of the chassis 21 if the IC card 1 is inserted. Thus, if the IC card 1 is inserted into the loading apparatus 20 in a wrong way, the holder 22 at the first position is prohibited from sliding in the direction of arrow B in FIGS. 8 and 9 toward the rear side of the chassis 21 to prevent wrong insertion of the IC card 1 from taking place. Additionally, if the IC card 1 is inserted into the loading apparatus 20 in a wrong way, the resilient engaging member 60 does not become engaged with the anti-fall recess 12 of the IC card 1 and hence the IC card 1 is prevented from being inserted into the holder 22 at the first position to allow the first connection terminals 56 to be engaged with the corresponding respective engaging recesses 6 and establish electric connection with the corresponding respective terminals 7 of the terminal section 3.

Figure 10:
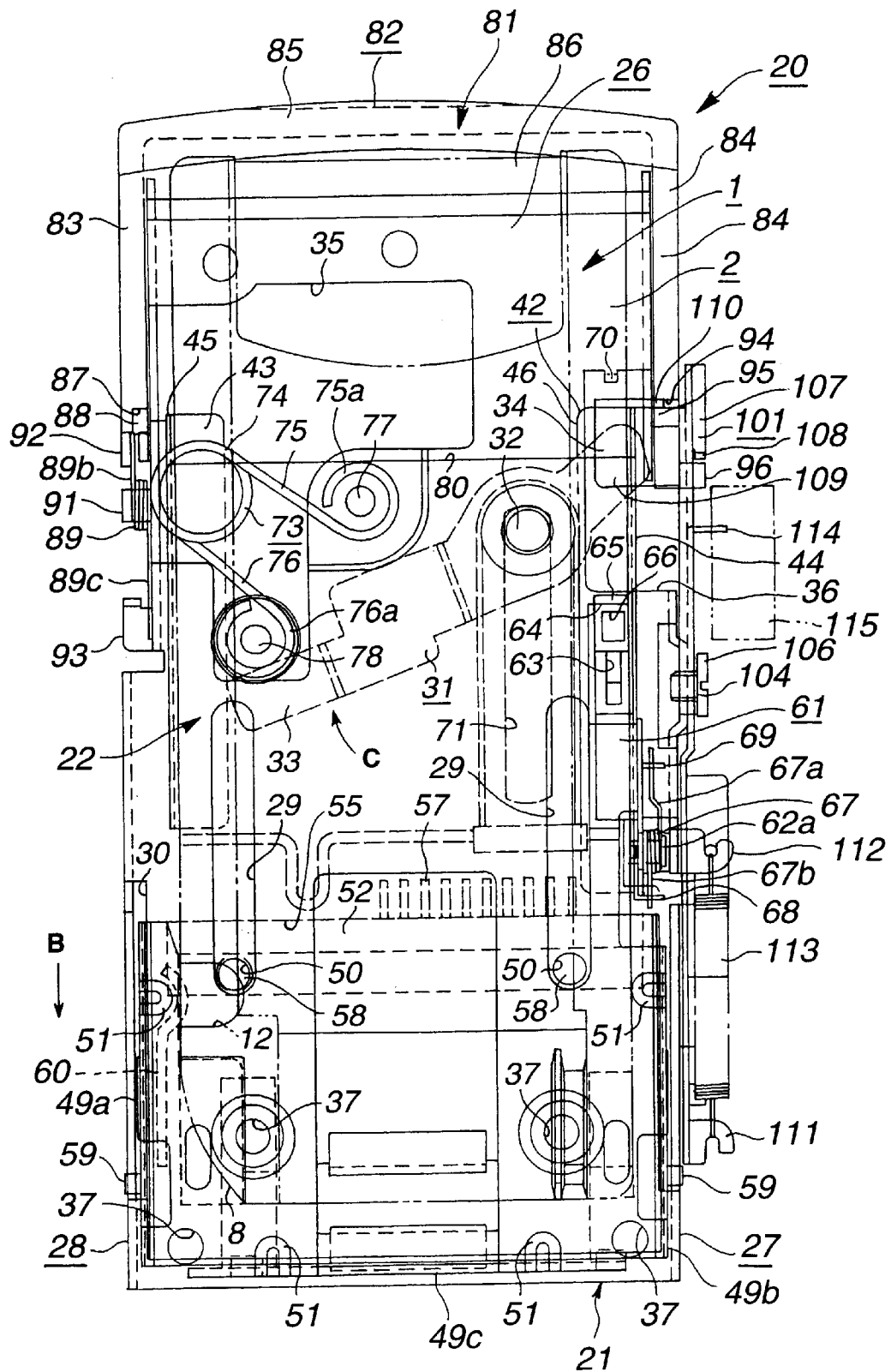
FIG. 10 is a schematic plan view of the loading apparatus of FIG. 1, illustrating the state where the IC card is mounted onto the loading apparatus.

If the IC card 1 is pushed further in the direction of arrow A in FIGS. 8 and 9 after the IC card 1 is completely into the holder 22 at the first position located close to the front side of the chassis 21 as shown in FIGS. 8 and 9, the IC card 1 is completely contained in and mounted on the loading apparatus 20 so that information signals can be recorded in or reproduced from the semiconductor memory as shown in FIG. 10. In other words, if the IC card 1 is pushed further from the state as shown in FIGS. 8 and 9, the restriction member 61 of the holder 22 and the engaging projection 70 of the chassis 21 are released from the mutual engagement and the holder 21 that is in the state of being slidable in the direction of arrow B in FIGS. 8 and 9 is driven to actually move in the direction of arrow B in FIGS. 8 and 9 toward the rear side of the chassis 21.

Then, the toggle spring 73 is subjected to the pressure applied by the IC card 1 to move the holder 22 in the direction of arrow B in FIG. 10 and turned from the first state of urging the holder in the direction of arrow B in FIG. 10 to the second sate of urging the holder 22 in the direction opposite to arrow B in FIG. 10. Thus, the toggle spring 73 urges the holder 22 in the direction of arrow B in FIG. 10 and drives it to slide toward the second position located close to the chassis 21. As a result, the IC card now connected to the connector 52 is completely contained in the loading apparatus 20. Then, the lid 81 that is used to be prevented by the rear side of the IC card 1 from closing the front side of the chassis 21 is now turned in the sense of arrow E in FIG. 9 to close the front side of the chassis 21 by the urging force of the torsion spring 89 and prevent dust from entering the loading apparatus 20. Additionally, the swing arm 31 rotatably fitted to the bottom plate 26 of the chassis 21 is turned in the sense opposite to arrow C in FIG. 10 as its pusher section 33 located at an end thereof is pushed by the second engaging projection 78 that is engaged with the engaging section 76a of the second arm 76 of the toggle spring 73 to drive the holder 22 to slide in the direction of arrow B in FIG. 10.

In the above described state where the terminals 7 of the IC card 1 and the first connection terminals 56 of the connector 52 are respectively connected with each other, the IC card 1 mounted to the second position close to the rear side of the chassis 21 is controlled by way of the flexible wiring board connected to the second connection terminals 57 of the connector 52. More specifically, when the IC card is mounted to the second position, information signals can be recorded in or reproduced from the semiconductor memory contained in the card member 2 by means of a control signal from the electronic equipment.

Figure 11:
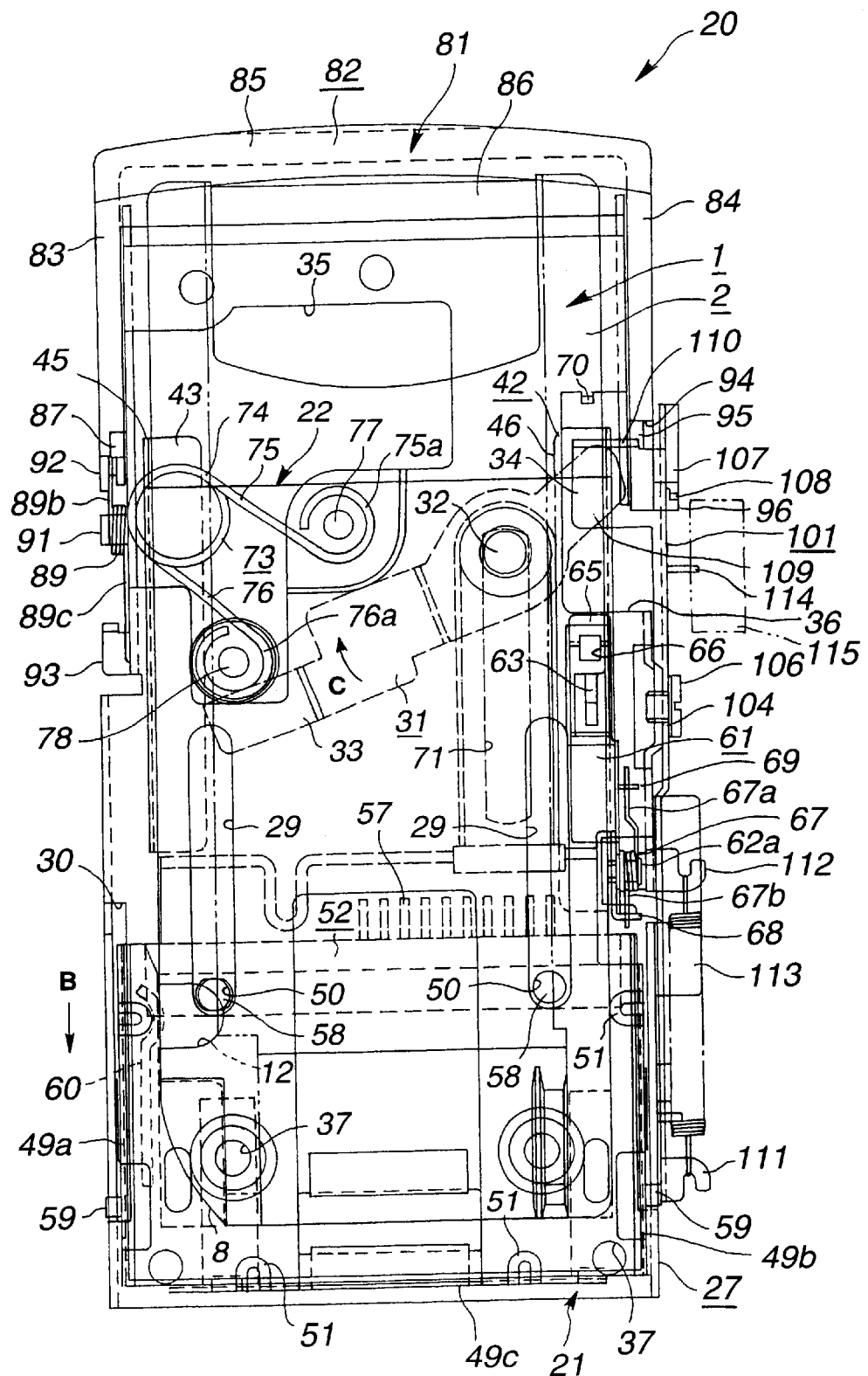
FIG. 11 is a schematic plan view of the loading apparatus of FIG. 1, illustrating the initial state where the IC card mounted onto the loading apparatus is discharged.
Figure 12:
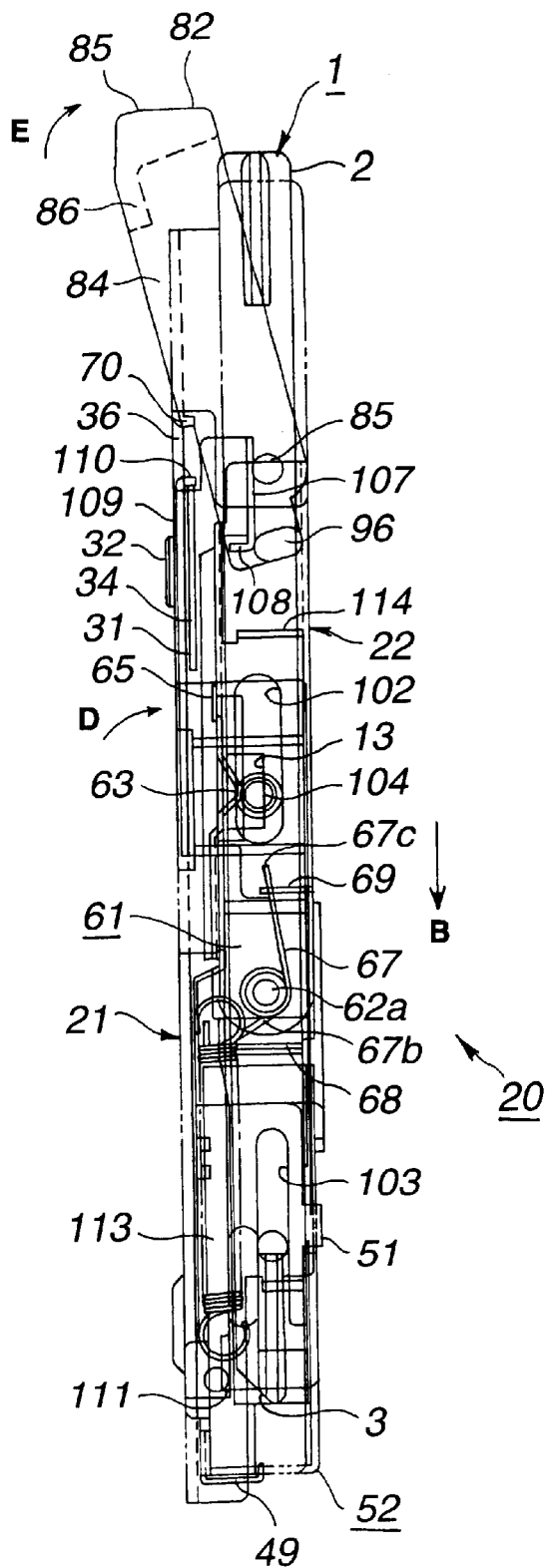
FIG. 12 is a schematic lateral view of the loading apparatus of FIG. 1, illustrating the initial state where the IC card mounted onto the loading apparatus is discharged.

The IC card 1 mounted on the loading apparatus 20 in a manner as described above can be ejected from the loading apparatus 20 by operating the apparatus in a manner as discussed below. Referring to FIGS. 11 and 12, as the operating part 114 is pushed in the direction of arrow B in FIGS. 11 and 12 by way of the ejecting/operating section 115 located outside the cabinet of the apparatus main body, the eject member 101 is drive to slid in the direction of arrow B in FIGS. 11 and 12 against the urging force of the tensile spring 113.

Then, the cam section 107 of the eject member 101 pushes the projection 95 arranged on the second swing/support arm 84 of the lid 81 in the direction of arrow B in FIGS. 11 and 12. As shown in FIG. 6, the cam section 107 has the bent section 108, while the projection 96 is provided with the inclined surface section 97 facing the bent section 108 located therebelow so that the cam section 107 can reliably pushes the projection 95. As the cam section 107 pushes the projection 96 of the lid 81, the lid 81 that closes the front side of the chassis 21 under the effect of the urging force of the torsion spring 89 is subjected to the pushing force of the cam section 107 trying to push the projection 96 of the lid 81 and consequently turned in the sense opposite to arrow E in FIG. 12 against the urging force of the torsion spring 89 to open the front side of the chassis 21 so that the IC card 1 can be ejected out of the loading apparatus.

At the same time, the pusher section 110 formed at the operating part 109 of the eject member 101 is turned in the sense opposite to arrangement C in FIG. 11 to abut the section 4 to be pushed of the swing arm 31 that is located close to the front side of the chassis 21. As the eject member 101 is driven to slide further in the direction of arrow B in FIGS. 11 and 12, the pusher section 110 pushes the section 34 to be pushed of the swing arm 31 in the sense of arrow C in FIG. 11 to consequently turn the swing arm 31 in that sense. Then, the pusher section 33 of the swing arm 31 pushes the second engaging projection 78 engaged with the engaging section of the second arm section 76 of the toggle spring 73 under the effect of the pushing force of the pusher section 110 of the eject member 101 pushing the section 34 to be pushed of the swing arm 31. Then, the toggle spring 73 that is in the second state of connecting the chassis 21 and the holder 22 is turned back to the first state of urging the holder 22 in the direction of arrow B in FIG. 11 and driving the holder 22 to slide in the direction opposite to arrow B in FIGS. 11 and 12. As a result, the holder 22 located at the rear side of the chassis 21 slides to the first position located close to the front side of the chassis 21 and causes the rear side of the IC card 1 to face the outside of the loading apparatus 20 through the front opening of the chassis 21.

The IC card 1 whose rear side is now facing the outside of the loading apparatus 20 through the front opening of the chassis 21 is pulled out of the holder 22 at the first position located close to the front side of the chassis 21 by the user to release the terminal section 3 of the IC card 1 and the connection terminals 56 of the connector 52 from the mutual connection. Thereafter, the lid 81 is turned in the sense of arrow E in FIGS. 11 and 12 under the effect of the urging force of the torsion spring 89 to close the front side of the chassis 21 and also the insertion/release port 40 of the holder 22 at the first position so that dust is prevented from entering the inside of the loading apparatus 20.

When ejecting the IC card 1, the loading apparatus 20 having the above described configuration does not release the first connection terminals 56 of the connector 52 arranged on the holder 22 and the terminals 7 of the terminal section 3 of the IC card 1 from the mutual engagement if the holder 22 is simply moved to the first position located close to the front side of the chassis from the second position located close to the rear side of the chassis 21 under the effect of the pushing force applied by the user to the ejecting/operating section of the cabinet of the apparatus main body. In other words, the IC card 1 is ultimately taken out of the loading apparatus 20 by the user. Therefore, the force required to push the eject button and operate the ejecting/operating section from the loading apparatus in order to release the first terminals 56 of the connector 52 and the terminals 7 of the terminal section 3 of the IC card 1 from the mutual engagement is reduced and hence the user can easily operates the loading apparatus 20 to eject the IC card 1. Additionally, if the IC card 1 is inserted in a wrong way, the restriction hole 66 remains in the state of being engaged with the engaging projection 70 of the chassis 21 so that any operation of mistakenly inserting the IC card 1 into the loading apparatus 20 can effectively be prevented.

While the use of a restriction member 61 is described as means for preventing erroneous insertion of an IC card 1 into the loading apparatus 20, the means for preventing erroneous insertion of an IC card 1 may alternatively have a configuration as described below. Note that the loading apparatus 120 as described below is substantially identical with the above described loading apparatus 20 except the restriction member so that the components of the loading apparatus 120 same as those of the loading apparatus 20 will be denoted respectively by the same reference symbols and will not be described any further.

Figure 13:
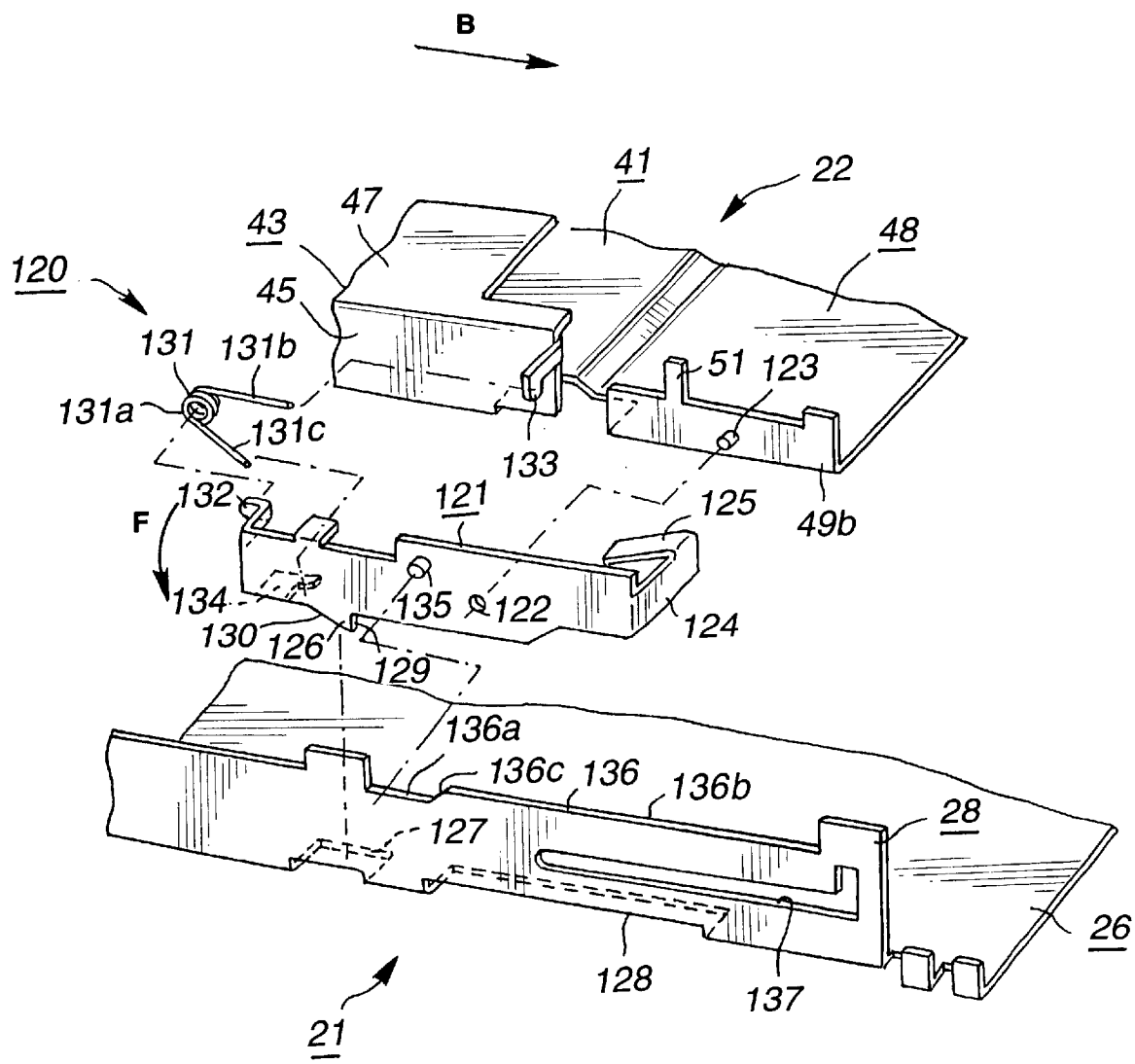
FIG. 13 is an exploded schematic perspective view of another loading apparatus for loading an IC card to which the present invention is applied.

Referring to FIG. 13, the loading apparatus 120 is provided near the lateral wall 45 of the holder 22 with a restriction member 121 adapted to prevent the holder 22 from moving from the first position located close to the front side of the chassis 21 to the second position located close to the rear side of the chassis 21. The restriction member 121 has an oblong profile so that it may be arranged along the lateral wall 45 of the holder 22. The restriction member 121 is provided at a middle area thereof with a support hole 122 bored therethrough. The support hole 122 receives a pivot 123 formed on the restriction wall 49b of the connector fitting section 48 that is arranged in alignment with the lateral wall 45 of the holder 22 to make the restriction member 121 rotatable both in the sense of arrow F and in the sense opposite to arrow F in FIG. 13. Note that, in the case of the loading apparatus 120, the holder 22 is not provided with a restriction wall 49c as part of the connector fitting section 48 arranged on the rear side so that the rear side is open.

As the restriction member 121 is fitted the restriction wall 49b, a bent part 124 is formed at the rear end of the restriction member 121 located close to the rear side of the holder 22 and bent substantially rectangularly toward the inside of the holder 22. The bent part 124 is provided with a section 125 to be pushed that receives and becomes pushed by the sloped sections 3a of the front side of the IC card 1. The section 125 to be pushed faces the inside of the holder 22 through the rear side of the holder so that, when the IC card 1 is properly inserted into the holder 22, it is bent downward with an acute angle from the top of the bent part 124 to face the sloped sections 3a of the IC card 1.

The restriction member 121 is additionally provided at a middle area of the lower edge thereof with a restricting section 126 for restricting the movement of the holder 22 from the first position to the second position. When the holder 22 is locked to the first position located near the front side of the chassis 21, the restricting section 126 becomes engaged with an engaging hole 127 cut through the bottom plate 26 and the second lateral wall 28 of the chassis 21. Additionally, the chassis 21 is provided at a position closer to the rear side than the engaging hole 127 with a slit 128 for allowing the restricting section 126 to escape, said slit 128 extending over the bottom plate 26 and the second lateral wall 28 of the chassis 21. The restricting section 126 is provided at the rear end thereof with a perpendicular surface area 129 that effectively prevents the holder 22 from moving from the first position to the second position located close to the rear side of the chassis 21 until an IC card 1 is inserted into the holder 22 and ensures the engagement with the rear end of the engaging hole 127. Additionally, the restricting section 126 is provided with a sloped surface 130 for smoothly receiving the front end of the slit 128 when the holder 22 is moved from the second position located close to the rear side of the chassis 21 to the first position located close to the front side of the chassis 21 in order to eject the IC card 1.

The support hole 122 of the restriction member 121 receives the pivot 123 formed on the restriction wall 49b of the holder 22 so that the restriction member 121 is fitted to the restriction wall 49b so as to be rotatable both in the sense of arrow F and in the sense opposite to arrow F in FIG. 13.

Additionally, the restriction member 121 is urged to turn in the sense of arrow F in FIG. 13 by a torsion spring, which is an urging member. The base section 131 of the torsion spring 131 is fitted to a fitting part 132 formed at the front end of the restriction member 121 located oppositely relative to the rear side where the section 125 to be pushed is formed. One of the arms, or arm section 131b, of the torsion spring 131 is anchored to anchoring member 133 formed on the lateral wall 45 of the holder 22, while the other arm, or arm 131c, is anchored to anchoring member 134 formed at the lower end of the restriction member 121. As a result, the torsion spring 131 urges the restriction member 121 in the sense of arrow F in FIG. 13 so as to make the restricting section 126 to become engaged with the engaging hole 127.

The restriction member 121 that is urged in the sense of arrow F in FIG. 13 is also provided with a revolution control projection 135 that prevents the restriction member 121 from turning excessively in the sense of arrow F in FIG. 13. The revolution control projection 135 becomes engaged with cam section 136 arranged at the top of the second lateral wall of the chassis 21. When the holder 22 is at the first position located close to the front side of the chassis 21, the revolution control projection 135 is engaged with first horizontal surface area 136a of the chassis 21. When, on the other hand, the holder 22 is at the second position located close to the rear side of the chassis 21, the revolution control projection 135 is engaged with second horizontal surface area 136b of the chassis 21. The cam section 136 comprises the first horizontal surface area 136a, the second horizontal surface area 136b and an inclined surface area 136c connecting the first horizontal surface area 136a and the second horizontal surface area 136b. The first horizontal surface area 136a is lower than the second horizontal surface area 136b. The revolution control projection 135 moves sequentially on the first horizontal surface area 136a, the inclined surface area 136c and the second horizontal surface area 136b when the holder 22 moves from the first position to the second position.

The pivot 123 of the holder 22 received in the support hole 122 of the restriction member 121 is engaged with guide hole 137 formed in the second lateral wall 28 of the chassis 21 and running along the moving direction of the holder 22.

Figure 14:
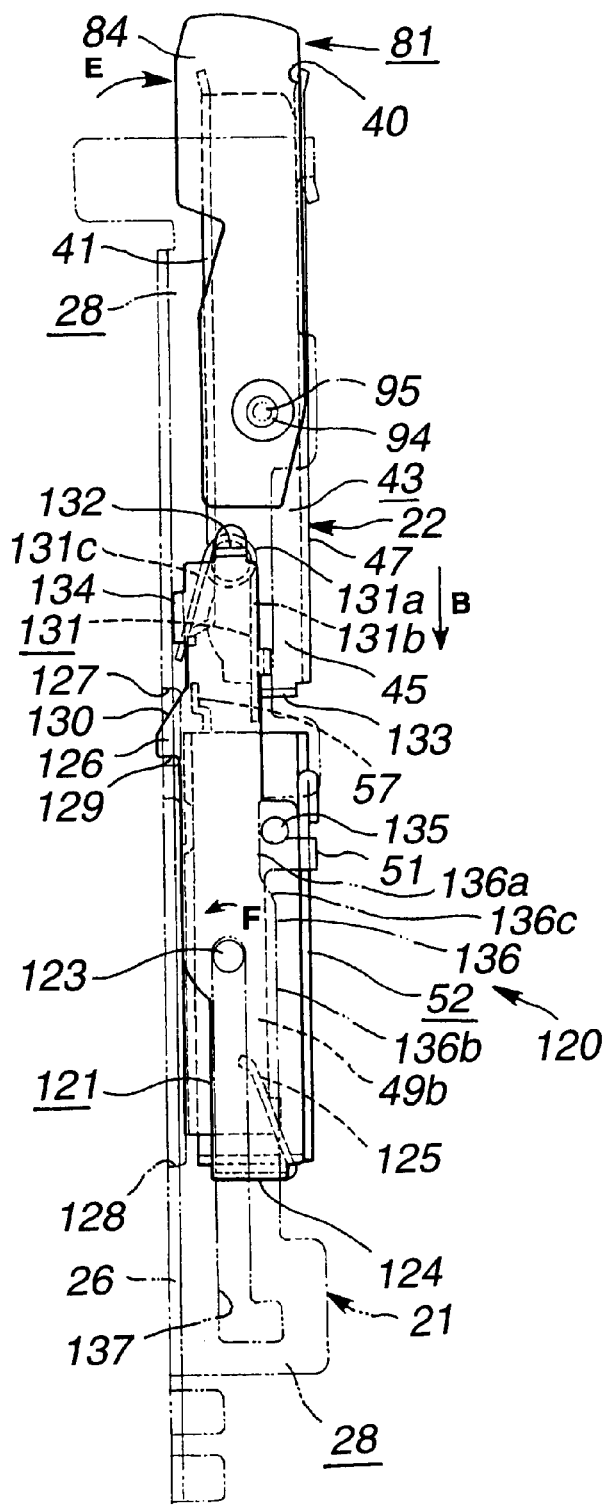
FIG. 14 is a schematic lateral view of the loading apparatus of FIG. 13 when it is not used.

Now, the sequence of operation of the loading apparatus 120 having the above described configuration from the time when an IC card 1 is inserted there to the time when information signals are recorded in or reproduced from the semiconductor memory of the IC card 1 will be discussed below. Firstly, the loading apparatus 120 in an idle state will be described. When the loading apparatus 120 is not in use, the holder 22 is at the first position located close to the front side of the chassis 21 as shown in FIG. 14. In this state, the restriction member 121 is turned around the pivot 123 in the sense of arrow F in FIG. 14 by the urging force of the torsion spring 131 and the holder 22 having the restriction member 121 is locked to the first position located close to the front side of the chassis 21. Note that, under this condition, the revolution control projection 135 of the restriction member 121 is engaged with the first horizontal surface area 136a of the cam section 136.

Then, an IC card 1 is inserted into the holder 22 of the loading apparatus 120 that is locked to the first position by the restriction member 121 from the side of the terminal 3 that operates as leading edge. When the IC card 1 is inserted into the loading apparatus 120 from the front side of the latter, the lid 81 is moved away from the front side of the chassis 21 to expose the insertion/release port 40 of the holder 22 as the lid 81 is turned in the direction opposite to arrow E in FIG. 15 by means of a finger tip or by hooking it with the front end of the IC card.

Then, as the lid 81 is moved away from the front side of the chassis 21 to open the front side, the IC card 1 is inserted into the holder 22 through the insertion/release port 40 with the side of the terminal 3 operating as leading edge. Then, the first connection terminals 56 of the connector 42 become engaged with the engaging recesses 6 of the IC card 1 through the open end of the terminal 3 and electrically connected with the corresponding respective terminals 7, which are pressed by the respective terminals 56. Because the restricting section 125 of the restriction member 121 is engaged with the engaging hole 127 of the chassis 21 and the holder 22 is locked to the first position until the first connection terminals 56 and the corresponding respective terminals 7 are engaged with each other, the first connection terminals 56 come to be reliably engaged with the corresponding respective engaging recesses 6 and electrically connected with the corresponding respective terminals 7 of the IC card 1. When the IC card 1 is completely inserted into the holder 22 at the first position, the section 125 to be pressed of the restriction member 121 is pressed by the respective sloped sections 3a of the IC card 1. Then, the restriction member 121 is turned in the sense opposite to arrow F in FIG. 15 against the urging force of the torsion spring 131 to release the restricting section 126 and the engaging hole 127 from the mutual engagement so that the holder 22 is ready to be moved from the first position located close to the front side of the chassis 21 toward the second position located close to the rear side of the chassis 21.

If the IC card 1 is not properly inserted into the loading apparatus 120, the first connection terminals 56 are not engaged with the corresponding respective engaging recesses 6 of the terminal section 3 of the IC card 1. Then, the section 125 to be pressed of the restriction member 121 is not pressed by the sloped sections 3a of the IC card 1. Therefore, the restriction member 121 is not turned in the sense opposite to arrow F in FIG. 14 and the engagement of the restricting section 126 and the engaging hole 127 of the chassis 21 is maintained so that the holder 22 remains in the state of being locked to the first position. As a result, the holder 22 of the loading apparatus 120 at the first position is prohibited from sliding in the direction of arrow B toward the second position located close to the rear side of the chassis 21 and the IC card 1 is prevented from being inserted in a wrong way.

Figure 15:
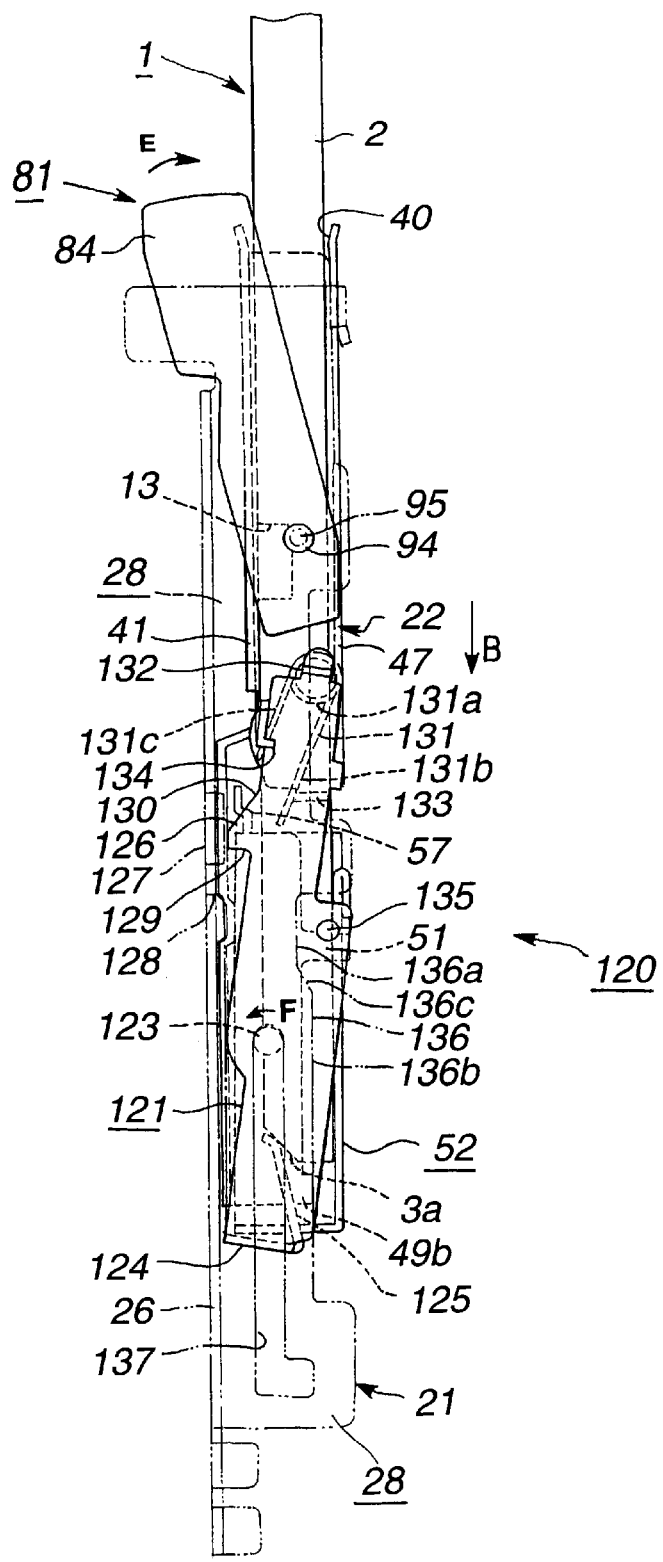
FIG. 15 is a schematic lateral view of the loading apparatus of FIG. 13, illustrating the state where the IC card is completely inserted into the holder held to the first position located at the front side of the chassis.
Figure 16:
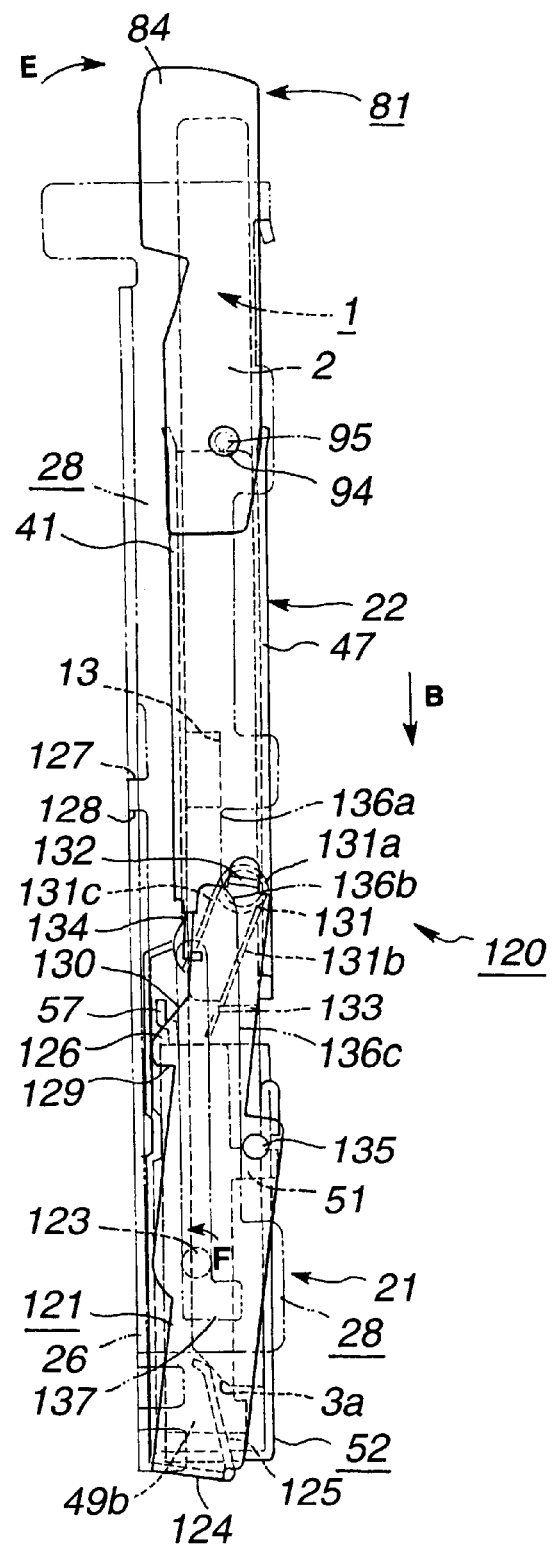
FIG. 16 is a schematic plan view of the loading apparatus of FIG. 13, illustrating the state where the IC card is mounted onto the loading apparatus.

When the IC card 1 is completely inserted into the holder 22 at the first position located close tot he front side of the chassis 21 as shown in FIG. 15 and pushed further in the direction of arrow B in FIG. 15, the IC card 1 is completely contained in and mounted on the loading apparatus 120 as shown in FIG. 16 so that information signals can be recorded in or reproduced from the semiconductor memory. Thus, as shown in FIG. 16, the holder at the first position located close to the front side of the chassis 21 is moved toward the second position located close to the rear side of the chassis 21 as the restriction member 121 is turned in the sense opposite to arrow F in FIG. 16 against the urging force of the torsion spring 131 to release the restricting section 126 and the engaging hole 127 from the mutual engagement. At this time, the revolution control projection 135 of the restriction member 121 moves from the first horizontal surface area 136a to the second horizontal surface area 136b higher than the first horizontal surface area 136a by way of the inclined surface area 136c of the cam section 136. The restriction member 121 is prevented from being turned in the sense of arrow F in FIG. 16 by the urging force of the torsion spring 131 as it is moved to the second horizontal surface area 136b higher than the first horizontal surface area 136a. Then, the lid 81 is turned in the sense of arrow E in FIG. 16 to close the insertion/release port 40 of the holder 22 and the front side of the chassis 21 and prevent dust from entering the inside of the loading apparatus 120.

The IC card 1 mounted on the loading apparatus 120 having the above described configuration is ejected out of the loading apparatus 120 in a manner as described below. As the ejecting/operating section 115 located outside the cabinet of the apparatus main body is operated, the holder 22 at the second position located close to the rear side of the chassis 21 is moved to the first position located close to the front side of the chassis 21. Then, as shown in FIG. 16, the restriction member 121 turned in the sense opposite to arrow F in FIG. 16 is made to be able to turn in the sense of arrow F in FIG. 15 as a result of the movement of the revolution control projection 135 from the second horizontal surface area 136b to the first horizontal surface area 136a lower than the second horizontal surface area 136b of the cam section 136. Note that, because the IC card 1 is inserted into the loading apparatus 120, the holder is in a state where the section 125 to be pressed of the restriction member 121 is pressed against the sloped sections 3a of the IC card 1 and hence in the state of being turned in the sense opposite to arrow F in FIG. 15. The rear side of the IC card 1 faces the outside through the insertion/release port 40 of the holder 22 that is cleared of the lid 81.

Then, as the IC card 1 is pulled out of the holder 22 at the first position by the user, the electric connection between the terminal section 3 of the IC card 1 and the first terminals 56 of the connector 52 are disrupted. At the same time, the section 125 to be pressed of the restriction member 121 is released from the state of being pressed against the sloped sections 3a of the IC card 1 and turned in the sense of arrow F in FIG. 14 by the urging force of the torsion spring 131 as shown in FIG. 14. As a result, the restricting section 126 of the restriction member 121 is engaged with the engaging hole 127 of the chassis 21 and the holder 22 is locked to the first position located close to the front side of the chassis 21. After the IC card 1 is completely pulled out of the loading apparatus 120, the lid 81 is turned in the sense of arrow E in FIG. 14 to close the insertion/release port 40 of the holder 22 at the first position and prevent dust from entering the inside of the loading apparatus 120.

With the loading apparatus 120 of an IC card 1 having the above described configuration, as in the case of the loading apparatus 20 described earlier, the operation of fitting the connector 52 to the holder 22, that of inserting the IC card 1 into the holder and that of taking out the IC card 1 from the holder 22 of the loading apparatus 120 are carried out by the user to reduce the force required to eject the IC card 1 out of the loading apparatus 120 to the convenience of the user. Additionally, with this loading apparatus 120, the section 125 to be pressed of the restriction member 121 is pressed and the restricting section 126 and the engaging hole 127 of the chassis 21 are released from the engagement to allow the holder to move to the second position located close to the rear side of the chassis 21 where information signals can be recorded in or reproduced from the semiconductor memory only when the IC card 1 is properly inserted into the holder 22 at the first position. In other words, the section 125 to be pressed of the restriction member 121 is not pressed and the engaging section 126 and the engaging hole 127 is not released from the engagement so that the holder is not moved from the first position to the second position if the IC card 1 is not properly inserted into the holder 22. Therefore, any operation of mistakenly inserting the IC card 1 into the loading apparatus 20 can effectively be prevented. While the restriction member is fitted to the holder in this embodiment of the invention, the restriction member may take any form so long as it restrict the movement of the holder 22 relative to the chassis 21. For instance, the restriction member may be fitted to the chassis 21.

What is claimed is:

1. A transfer apparatus for transferring a storage medium comprising:

a holder for holding said storage medium, said holder being movable on a chassis of the transfer apparatus between a first position for loading and unloading said storage medium and a second position for containing said storage medium;

a connector arranged in said holder and adapted to be connected to a terminal section of said storage medium when said holder is at said first position; and a restriction member for restricting movement of said holder from said first position to said second position when said storage medium is loaded in said holder and said connector is not connected to said terminal section.

2. The transfer apparatus according to claim 1, wherein said restriction member has a restricting section for engagement with an engaging section formed on said chassis and for restricting the movement of said holder from said first position to said second position.

3. The transfer apparatus according to claim 1, wherein said restriction member cancels said restricting the movement of said holder after said connector is connected to said terminal section.

4. The transfer apparatus according to claim 3, wherein said restriction member has a projection for engagement with a recess formed in said storage medium and is adapted to cancel the restricting of the movement of said holder to said first position when said projection is engaged with said recess.

5. The transfer apparatus according to claim 4, wherein said restriction member is rotatably arranged on said holder is urged in a predetermined direction, and has a restricting section for engagement with an engaging section formed on said chassis; and said restricting section is adapted to be engaged with said engaging section as a front side of said storage medium and said projection are mutually engaged and turned together in a direction opposite to said predetermined direction, whereas the engagement of said restricting section and said engaging section is cancelled again as said storage medium is inserted and the recess of said storage medium and said projection are engaged with each other and urged to turn in said predetermined direction.

6. The transfer apparatus according to claim 3, wherein said restriction member has a restricting section for engagement with an engaging section formed on said chassis and a section to be pressed a the leading edge of said storage medium; and the engagement of said restricting section and said engaging section is cancelled as said storage medium is inserted into said holder at said first position and said section to be pressed is pressed by said leading edge.

7. The transfer apparatus according to claim 6, wherein said restriction member is rotatably arranged on said holder and urged to turn in a predetermined direction; and the engagement of said restricting section and said engaging section is cancelled as said section to be pressed is engaged with the leading edge of said storage medium inserted into said holder and turned in a direction opposite to said predetermined direction.

8. The transfer apparatus according to claim 5, wherein said restriction member is adapted to cancel said restricting the movement of said holder when said storage medium is inserted into said holder.

9. The transfer apparatus according to claim 3, wherein said restriction member has a hole for engagement with a projection formed on said chassis.

10. The transfer apparatus according to claim 3, wherein said restriction member has a projection for engagement with a hole formed in said chassis.

11. The transfer apparatus according to claim 1, wherein said holder is connected to said chassis by an urging member having an end anchored to said chassis and anchored at an other end to said holder; whereby said holder is urged in a direction toward said second position by said urging member after cancellation of said restriction by said restriction member.

12. The transfer apparatus according to claim 1, further comprising:

an eject member movably arranged on said chassis;

said holder being adapted to be moved from said second position to said first position as said eject member is moved in a direction of insertion of said storage medium into said holder.

13. The transfer apparatus according to claim 12, further comprising:

a swing arm rotatably arranged on said chassis;

said swing arm being adapted to move said holder from said second position to said first position upon being pushed at an end thereof by said eject member being moved in the direction of insertion of said storage medium into said holder.

14. The transfer apparatus according to claim 12, wherein said eject member is urged in a direction of ejecting said storage medium from said holder.

15. The transfer apparatus according to claim 1, further comprising:

a lid for closing and opening a front side of the chassis whereat said storage medium is inserted, said lid being arranged on said holder.

16. The transfer apparatus according to claim 15, wherein said lid has a closure section for closing the front side of said chassis and a swing/support section for swinging/supporting said closure section relative to said chassis.

17. A transfer apparatus according to claim 16, wherein said lid is adapted to be urged to close the front side of said chassis by an urging member having an end anchored to said chassis and an other end anchored to said swing/support section.

18. The transfer apparatus according to claim 17, further comprising:

an eject member movably arranged on said chassis;

said lid being adapted to be turned to open the front side of said chassis upon being pushed by said eject member being moved in a direction of insertion of said storage medium into said holder.

19. The transfer apparatus according to claim 18, wherein said lid is adapted to be turned to open the front side of said chassis against an urging force of said urging member upon a projection formed on said swing/ support section being pushed by a cam section formed on said eject member as said eject member is moved in the direction of insertion of said storage medium into said holder.

20. The transfer apparatus according to claim 1, wherein said connector is provided with an insertion-failsafe section for engagement with a recess formed on said storage medium when said storage medium is inserted into said holder.

21. A transfer apparatus for transferring a storage medium comprising:

holding means for holding said storage medium, said holding means being adapted to move on a chassis of said transfer apparatus between a first position for loading and unloading said storage medium and a second position for containing said storage medium;

connection means arranged in said holding means and adapted to be connected to a terminal section of said storage medium when said holding means is at said first position; and a restriction means for restricting movement of said holding means from said first position to said second position when said storage medium is loaded in said holder and said connection means is not connected to said terminal section.

22. The transfer apparatus according to claim 21, wherein said restriction means has a restricting section for engagement with an engaging section formed on said chassis and for restricting the movement of said holding means from said first position to said second position.

23. The transfer apparatus according to claim 21, wherein said restriction means cancels said restricting the movement of said holding means after said connection means is connected to said terminal section.

24. The transfer apparatus according to claim 23, wherein said restriction means has a projection for engagement with a recess formed in said storage medium and is adapted to cancel the restricting of the movement of said holding means to said first position when said projection is engaged with said recess.

25. The transfer apparatus according to claim 24, wherein said restriction means is rotatably arranged on said holding is urged in a predetermined direction, and has a restricting section for engagement with an engaging section formed on said chassis; and said restricting section is adapted to be engaged with said engaging section as a front side of said storage medium and said projection are mutually engaged and turned together in a direction opposite to said predetermined direction, whereas the engagement of said restricting section and said engaging section is cancelled again as said storage medium is inserted and the recess of said storage medium and said projection are engaged with each other and urged to turn in said predetermined direction.

26. The transfer apparatus according to claim 23, wherein said restriction means has a restricting section for engagement with an engaging section formed on said chassis and a section to be pressed by the leading edge of said storage medium; and the engagement of said restricting section and said engaging section is cancelled as said storage medium is inserted into said holding means at said first position and said section to be pressed is pressed by said leading edge.

27. The transfer apparatus according to claim 26, wherein said restriction means is rotatably arranged on said holding means and urged to turn in a predetermined direction; and the engagement of said restricting section and said engaging section is cancelled as said section to be pressed is engaged with the leading edge of said storage medium inserted into said holding means and turned in a direction opposite to said predetermined direction.

28. The transfer apparatus according to claim 25, wherein said restriction means is adapted to cancel said restricting the movement of said holding means when said storage medium is inserted into said holding means.

29. The transfer apparatus according to claim 23, wherein said restriction means has a hole for engagement with a projection formed on said chassis.

30. The transfer apparatus according to claim 23, wherein said restriction means has a projection for engagement with a hole formed in said chassis.

31. The transfer apparatus according to claim 21, wherein said holding means is connected to said chassis by an urging member having an end anchored to said chassis and anchored at an other end to said holding means, whereby said holding means is urged in a direction toward said second position by said urging member after cancellation of said restriction by said restriction means.

32. The transfer apparatus according to claim 21, further comprising:

eject means movably arranged on said chassis;

said holding means being adapted to be moved from said second position to said first position as said eject means is moved in a direction of insertion of said storage medium into said holding means.

33. The transfer apparatus according to claim 32, further comprising:

swing means rotatably arranged on said chassis;

said swing means being adapted to move said holding means from said second position to said first position upon being pushed at an end thereof by said eject means being moved in the direction of insertion of said storage medium into said holding means.

34. The transfer apparatus according to claim 32, wherein said eject means is urged in a direction of ejecting said storage medium from said holding means.

35. The transfer apparatus according to claim 21, further comprising:

closing/opening means for closing and opening a front side of the chassis whereat said storage medium is inserted, said closing/opening means being arranged on said holding means.

36. The transfer apparatus according to claim 35, wherein said closing/opening means has a closure section for closing the front side of said chassis and a swing/ support section for swinging/supporting said closure section relative to said chassis.

37. The transfer apparatus according to claim 36, wherein said closing/opening means is adapted to be urged to close the front side of said chassis by an urging member having an end anchored to said chassis and an other end anchored to said swing/support section.

38. The transfer apparatus according to claim 37, further comprising:

eject means movably arranged on said chassis;

said closing/opening means being adapted to be turned to open the front side of said chassis upon being pushed by said eject means being moved in a direction of insertion of said storage medium into said holding means.

39. The transfer apparatus according to claim 38, wherein said closing/opening means is adapted to be turned to open the front side of said chassis against an urging force of said urging member upon a projection formed on said swing/support section being pushed by a cam section formed on said eject means as said eject means is moved in the direction of insertion of said storage medium into said holding member.

40. The transfer apparatus according to claim 21, wherein said connection means is provided with an insertion-failsafe section for engagement with a recess formed on said storage medium when said storage medium is properly inserted into said holding means.

41. The transfer apparatus according to claim 21, wherein said holding means is adapted to hold a storage medium containing a semiconductor memory.

42. The transfer apparatus according to claim 21, wherein said holding means is adapted to hold a storage medium containing a magnetic disk.

43. A recording/reproduction apparatus adapted to record a signal on and reproduce a signal from a storage medium transferred thereto, said apparatus comprising:

a holder for holding said storage medium, said holder being movable on a chassis of said recording/reproduction apparatus between a first position for loading and unloading said storage medium and a second position for containing said storage medium;

a connector arranged in said holder and adapted to be connected to a terminal section of said storage medium when said holder is at said first position;

a restriction member for restricting movement of said holder from said first position to said second position when said storage medium is loaded in said holder and said connector is not connected to said terminal section; and a recording/reproduction section for recording a signal on and reproducing a signal from said storage medium held by said holder at said second position by said connector.

44. A recording/reproduction apparatus adapted to record a signal on and reproduce a signal from a storage medium transferred thereto, said apparatus comprising:

holding means for holding said storage medium, said holding means being movable on a chassis of said recording/reproduction apparatus between a first position for loading and unloading said storage medium and a second position for containing said storage medium;

connection means arranged in said holding means and adapted to be connected to a terminal section of said storage medium when said holding means is at said first position;

restriction means for restricting movement of said holding means from said first position to said second position when said storage medium is loaded in said holder and said connection means is not connected to said terminal section; and recording/reproduction means for recording a signal on and reproducing a signal from said storage medium held by said holder at said second position by way of said connections means.

45. A transfer method for transferring a storage medium comprising the steps of:

inserting a storage medium into a holder;

restricting said holder to remain at a first position;

connecting a terminal section of said storage medium and a connector arranged in said holder;

cancelling said restricting of said holder at a time of said connecting; and starting to move said holder having said storage medium inserted therein toward a second position for containing said holder upon said cancelling of said restriction.

46. The transfer method according to claim 45, wherein said step of restricting said holder includes the steps of:

turning a restriction member by said recording medium being inserted in said step of inserting; and restricting said holder to said first position by causing the restriction member to be engaged with a chassis.

47. The transfer method according to claim 46, wherein said step of cancelling said restricting of said holder includes a step of:

causing a recess on said storage medium and a projection on said restriction member to be engaged with each other in order to cancel said restricting at a time of said step of connecting.

48. The transfer method according to claim 45, further comprising the step of:

urging said holder in a direction of inserting said storage medium after the cancelling of the restricting of said holder.

49. The transfer method according to claim 48, further comprising the step of:

driving said holder holding said storage medium to move to said second position by an urging force directed in the direction of inserting said storage medium.

50. The transfer method according to claim 45, further comprising the steps of:

moving an eject member in a direction of inserting said storage medium; and driving said holder holding said storage medium to move from said second position to said first position while moving said eject member.

51. The transfer method according to claim 50, wherein said step of driving said holder to move to said first position includes the steps of:

turning a swing member arranged on a chassis by pushing said swing member at an end thereof upon said eject member being moved; and triggering movement of said holder from said second position to said first position by pushing the holder holding said storage medium by an other end of said swing member.

52. The transfer method according to claim 50, wherein said step of driving said holder to said first position includes the steps of:

urging said holder urged in the direction of inserting said storage medium in a direction of ejection of said storage medium; and driving said holder holding said storage medium to move to said first position by urging the storage medium in the direction of ejection of said storage medium.

53. A transfer method for transferring a storage medium comprising the steps of:
- inserting said storage medium into a holder;
- restricting said holder to remain at a first position;
- connecting a terminal section of said storage medium and a connector arranged in said holder;
- cancelling said restricting of said holder at a time of said step of connecting; and
- starting to drive said holder holding said storage medium to move toward a second position for containing said holder upon the cancelling of said restricting.

54. The transfer method according to claim 53, wherein said step of cancelling said restricting said holder includes the steps of:
- turning a restriction member restricting said holder by means of said storage medium being inserted when connecting said terminal section and said connector; and
- cancelling engagement of said restriction member and a chassis by turning said restriction member.

55. The transfer method according to claim 53, further comprising the steps of:
- urging said holder urged in a direction of ejection of said storage medium in a direction of insertion of said storage medium; and
- driving said holder holding said storage medium to move to said second position by an urging force in a direction of insertion of said storage medium.

* * * * *